United States Patent
Okada

(10) Patent No.: US 8,370,540 B2
(45) Date of Patent: Feb. 5, 2013

(54) DATA TRANSFER CONTROL DEVICE AND DATA TRANSFER CONTROL METHOD

(75) Inventor: Masaki Okada, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 13/014,311

(22) Filed: Jan. 26, 2011

(65) Prior Publication Data

US 2011/0185094 A1  Jul. 28, 2011

(30) Foreign Application Priority Data

Jan. 27, 2010  (JP) .................................. 2010-015766
Dec. 8, 2010  (JP) .................................. 2010-273835

(51) Int. Cl.
*G06F 13/28* (2006.01)

(52) U.S. Cl. ................ 710/22; 710/23; 710/24; 710/25; 710/26; 710/27; 710/28; 710/113

(58) Field of Classification Search ........................ None
See application file for complete search history.

(56) References Cited

U.S. PATENT DOCUMENTS 7,716,388 B2 * 5/2010 Jagathesan et al. ............. 710/22
7,904,614 B1  3/2011 Marshall et al.
2006/0259662 A1 * 11/2006 Furukawa et al. .............. 710/40
2008/0240111 A1 * 10/2008 Gadelrab ..................... 370/395.7
2009/0006669 A1  1/2009 Toyama et al.
2011/0131347 A1 * 6/2011 Marshall et al. ................. 710/22

FOREIGN PATENT DOCUMENTS

| JP | 2000-358067 A | 12/2000 |
| JP | 2002-304365 A | 10/2002 |
| JP | 2005-071186 A | 3/2005 |
| JP | 2005-117125 A | 4/2005 |
| JP | 2006-260472 A | 9/2006 |
| JP | 2006-332849 A | 12/2006 |

OTHER PUBLICATIONS

Anonymous, "Method for using FIFOs for handling out-of-order completions in a general-purpose DMA system," Oct. 11, 2006, IP.com, pp. 1-5.*
USPTO, [Lews-Taylor] Non-Final Office Action issued Nov. 27, 2012 in child U.S. Appl. No. 13/618,890 [pending].

* cited by examiner

*Primary Examiner* — Chun-Kuan Lee
*Assistant Examiner* — Dayton Lewis-Taylor
(74) *Attorney, Agent, or Firm* — Fujitsu Patent Center

(57) ABSTRACT

A data transfer control device that selects one of a plurality of DMA channels and transfers data to or from memory includes a request holding section configured to hold a certain number of data transfer requests of the plurality of DMA channels and a request rearranging section configured to select and rearrange the data transfer requests that are held in a basic transfer order so that the data transfer requests of each of the plurality of DMA channels are successively outputted for a number of successive transfers set in advance.

5 Claims, 15 Drawing Sheets

FIG. 1 BLOCK DIAGRAM ACCORDING TO 1ST EMBODIMENT

OPERATION FLOWCHART OF REQ. REARRANGING SEC. SC1

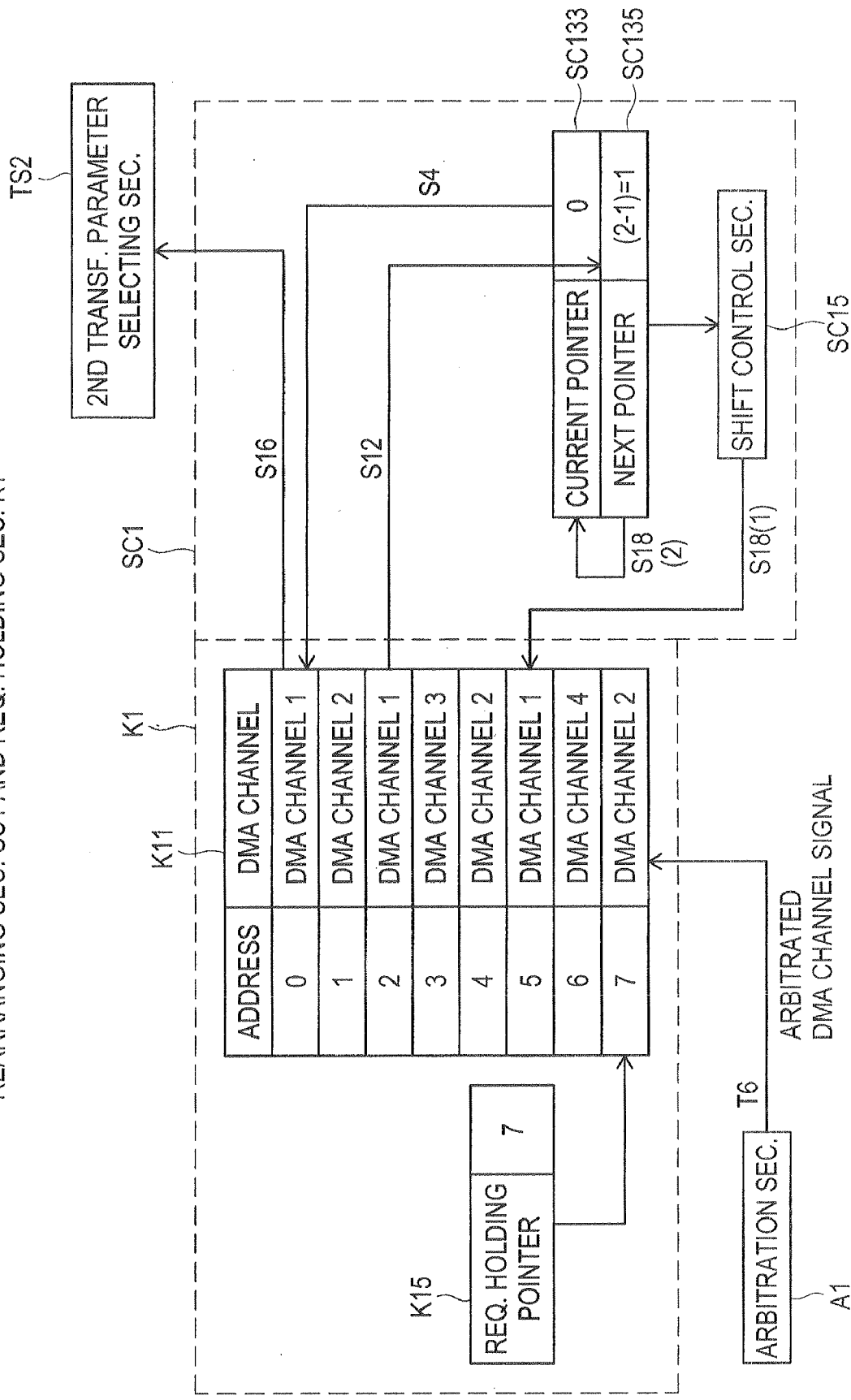
FIG. 4 EXAMPLE DIAGRAM FOR ILLUSTRATING OPERATION OF REQ. REARRANGING SEC. SC1 AND REQ. HOLDING SEC. K1

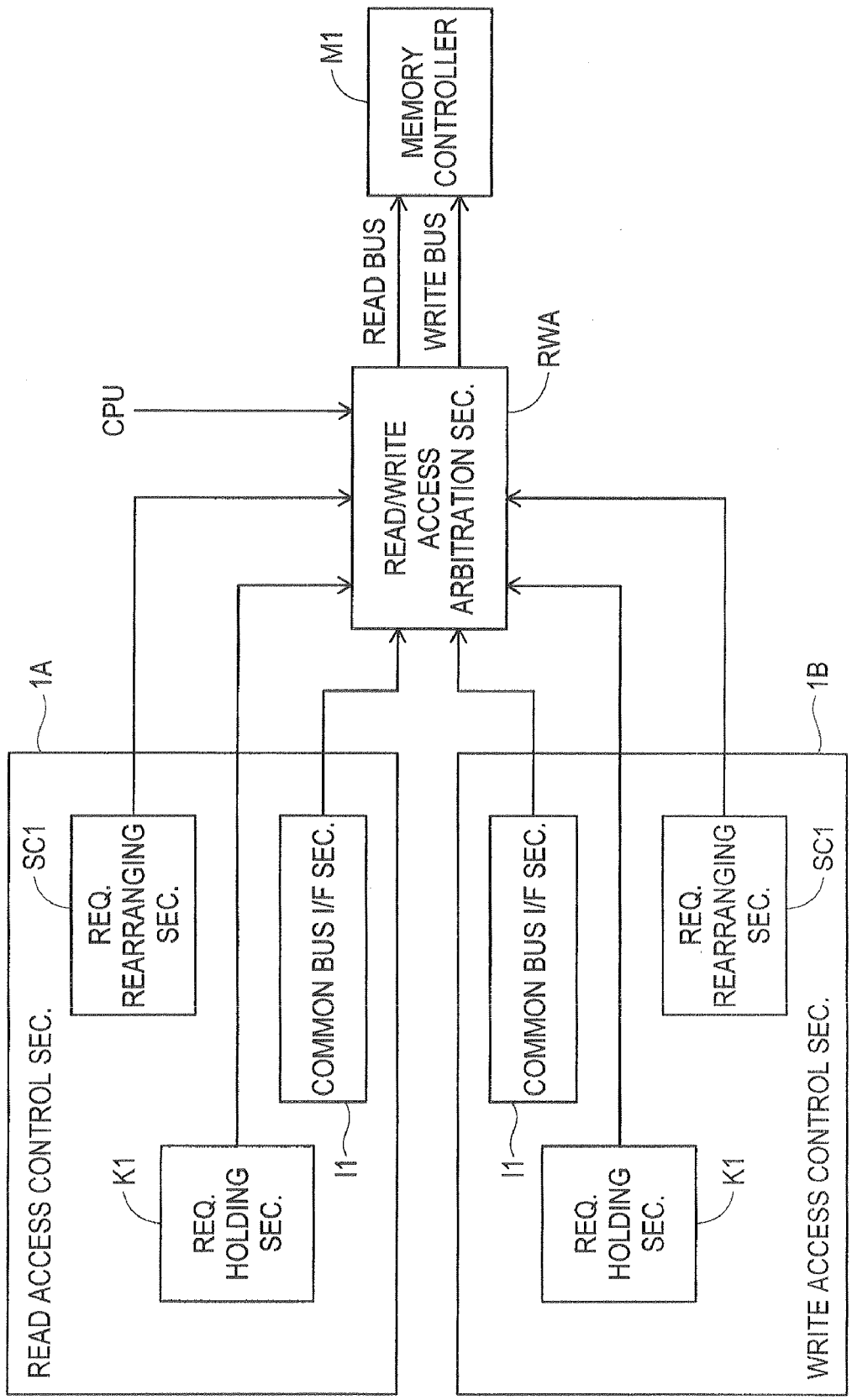
FIG. 5 BLOCK DIAGRAM ACCORDING TO 2ND EMBODIMENT

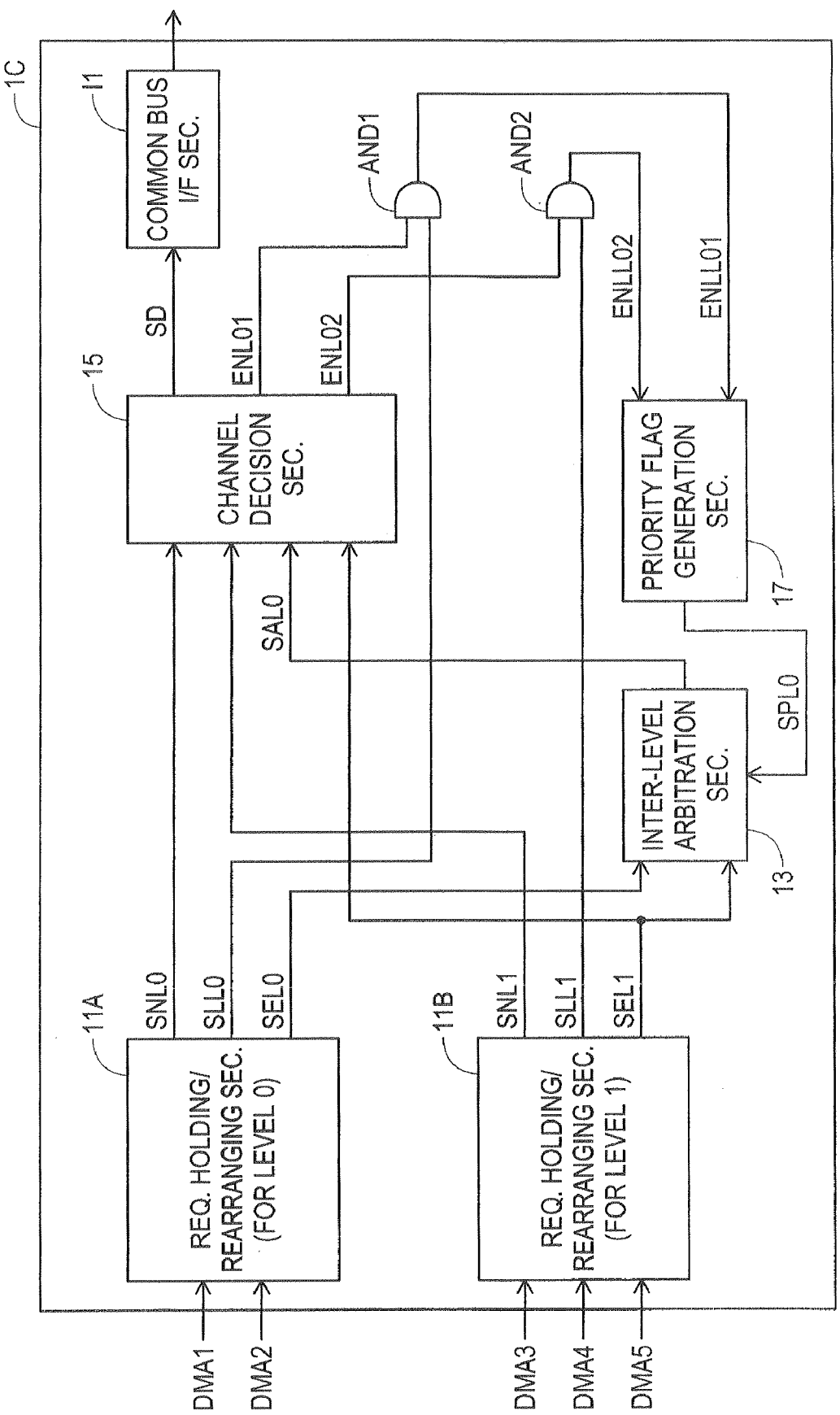
FIG. 6  BLOCK DIAGRAM ACCORDING TO 3RD EMBODIMENT

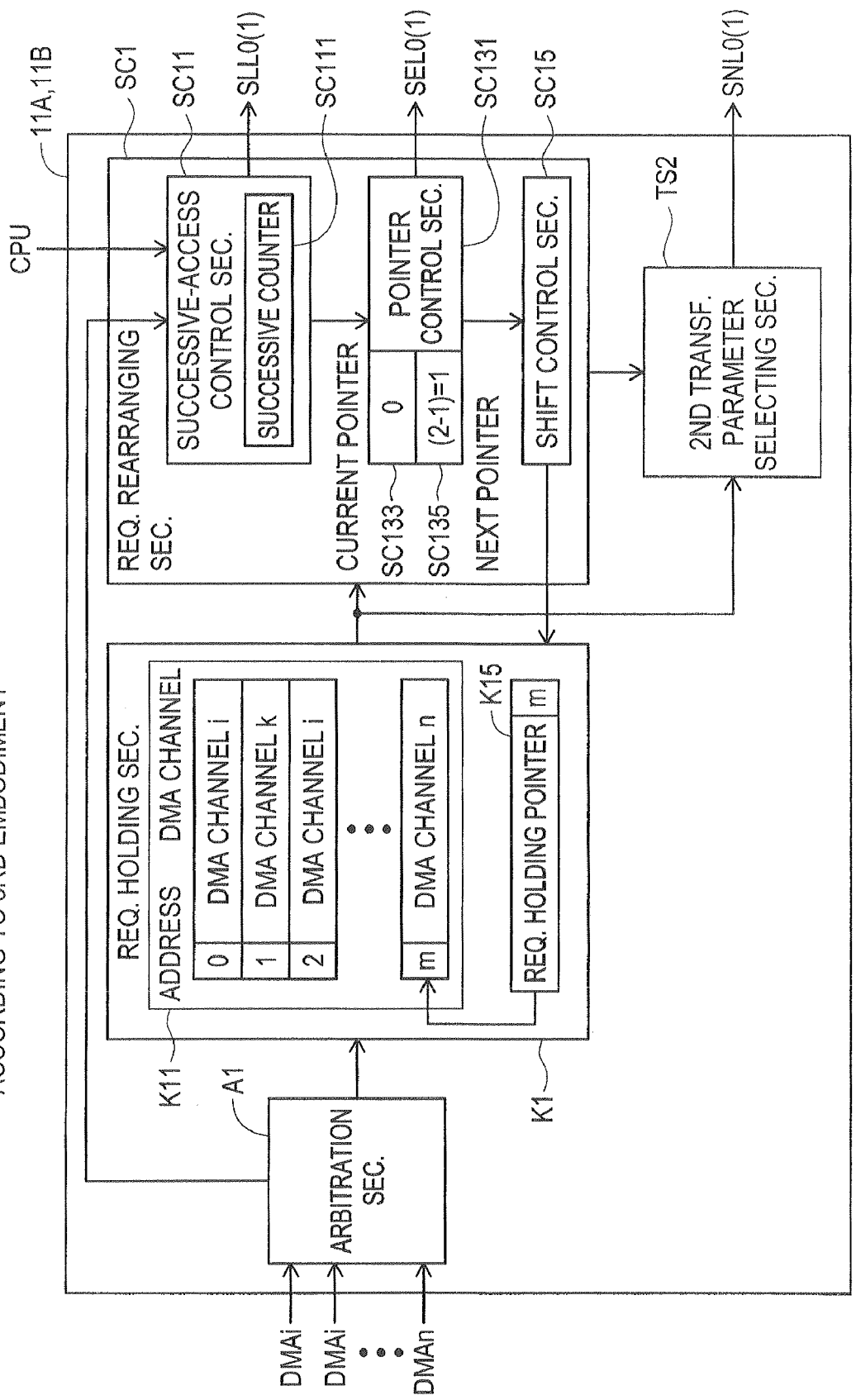

FIG. 8

EXPLANATORY DIAGRAM OF OPERATION AT INTER-LEVEL ARBITRATION SEC.

| PRIORITY FLAG SPL0 | VALIDITY SIGNAL SEL0 | VALIDITY SIGNAL SEL1 | SELECTION RESULT |
| --- | --- | --- | --- |
| 0 | 1 | 0 | VALIDITY SIGNAL SEL0 |
| 0 | 1 | 1 | VALIDITY SIGNAL SEL0 |
| 0 | 0 | 1 | VALIDITY SIGNAL SEL1 |
| 0 | 0 | 0 | don't care |
| 1 | 0 | 1 | VALIDITY SIGNAL SEL1 |
| 1 | 1 | 1 | VALIDITY SIGNAL SEL1 |
| 1 | 1 | 0 | VALIDITY SIGNAL SEL0 |
| 1 | 0 | 0 | don't care |

FIG. 9

EXPLANATORY DIAGRAM OF OPERATION AT CHANNEL DECISION SEC.

| INTER-LEVEL ARBITRATION SIGNAL (SAL0) | VALIDITY SIGNAL (SEL1) | SELECTION RESULT |
| --- | --- | --- |
| 1 | x | LEVEL 0 (SNL0) |
| 0 | 1 | LEVEL 1 (SNL1) |
| 0 | 0 | don't care |

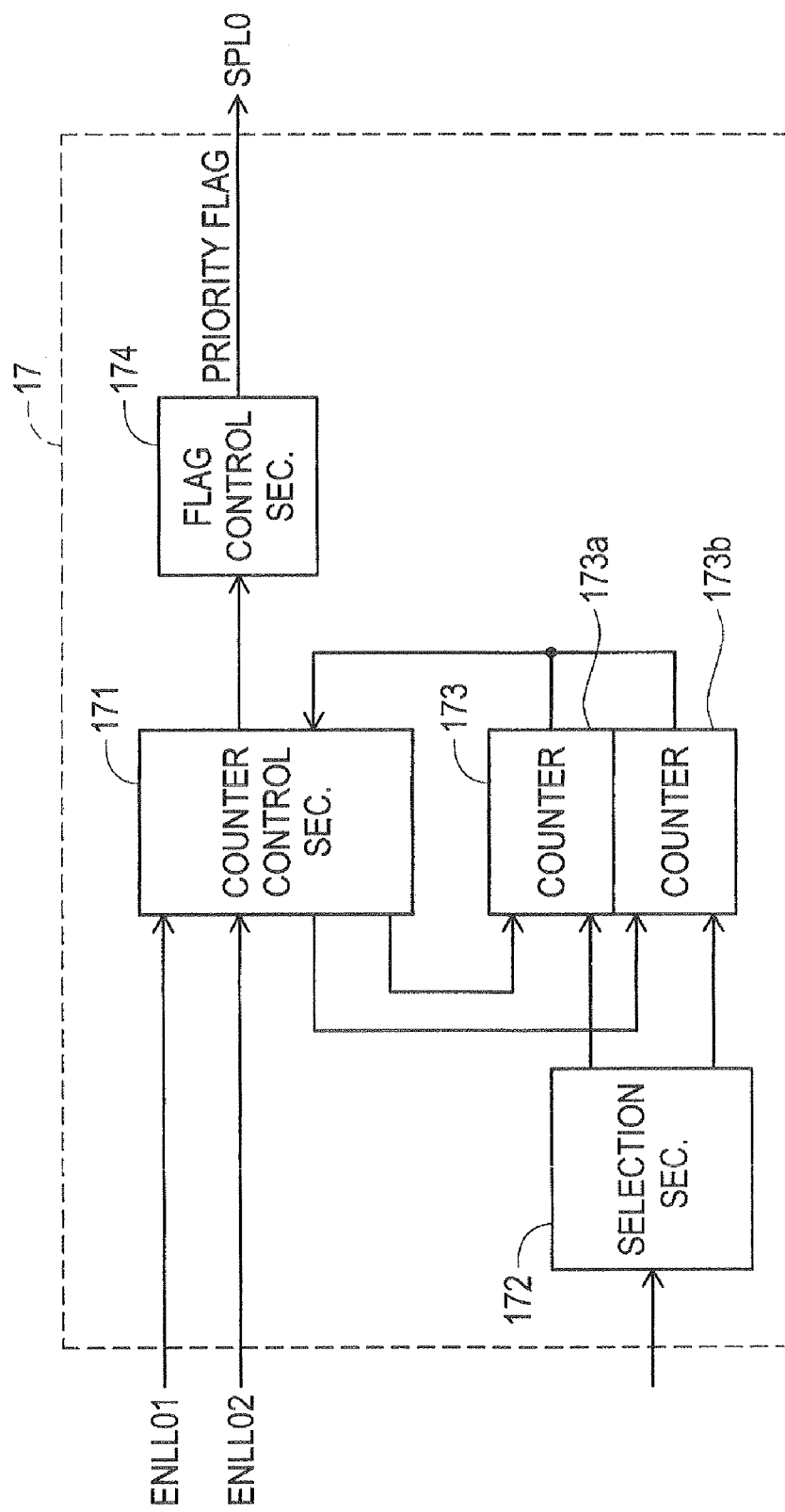
FIG. 10 BLOCK DIAGRAM OF PRIORITY FLAG GENERATION SEC.

FLOWCHART FOR
ILLUSTRATING OPERATION OF PRIORITY FLAG GENERATION SEC.

EXAMPLE OF REQ. ISSUANCE ACCORDING TO 3RD EMBODIMENT (PARTIAL) BLOCK DIAGRAM OF 1ST MODIFICATION FOR CONTROLLING ISSUANCE OF LEVEL 1 REQUEST (PARTIAL) BLOCK DIAGRAM OF 2ND MODIFICATION FOR CONTROLLING ISSUANCE OF LEVEL 1 REQUEST

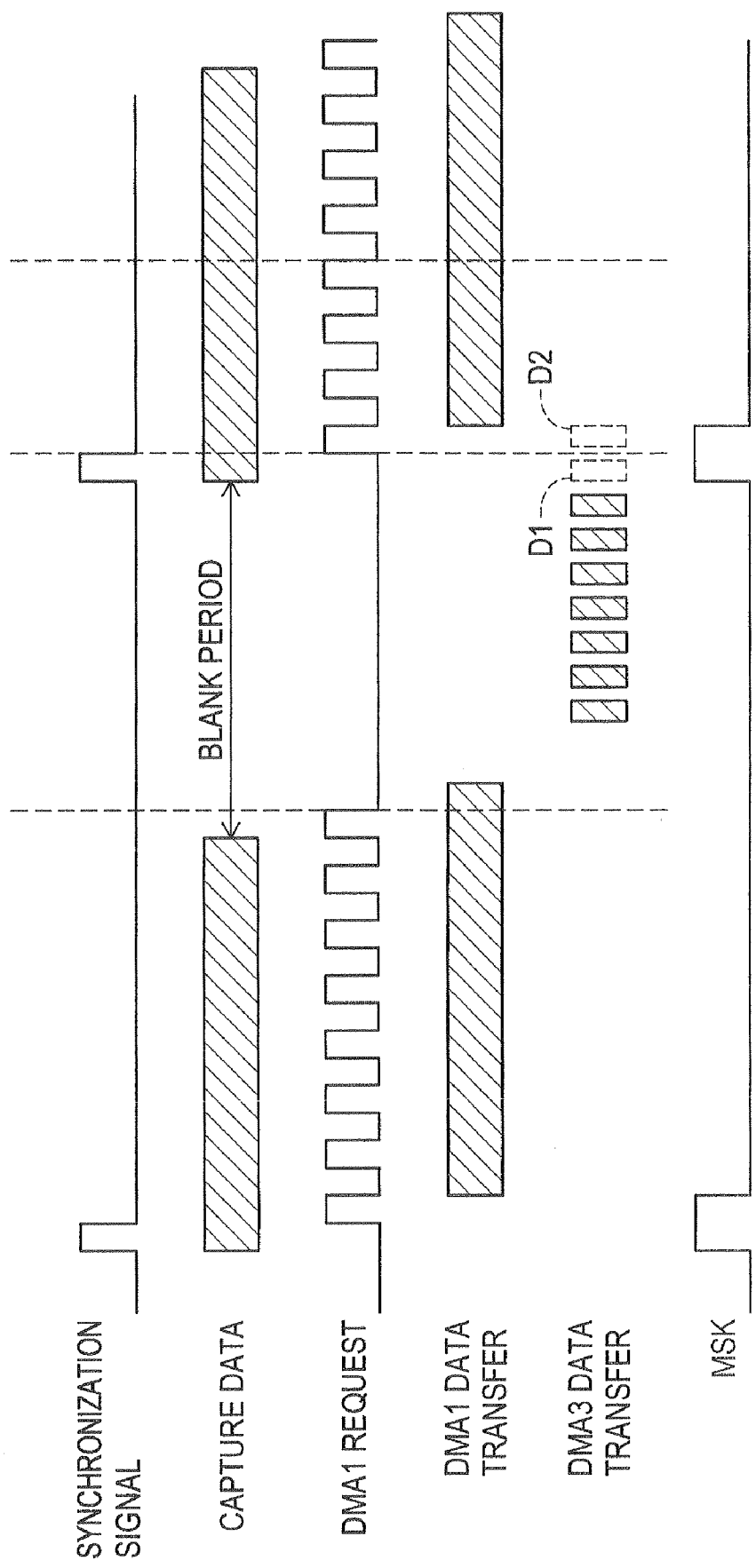

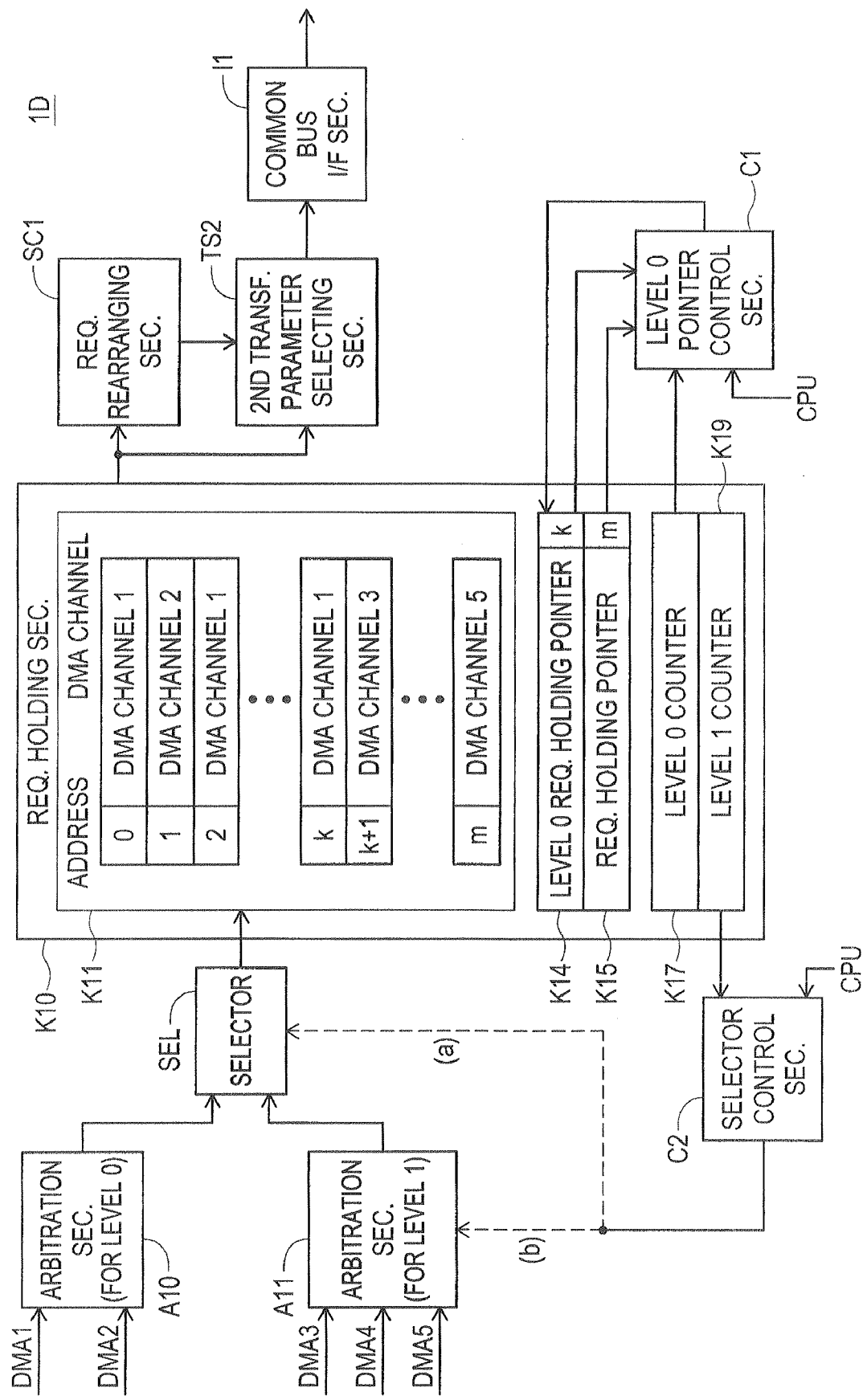
FIG. 16 (PARTIAL) BLOCK DIAGRAM ACCORDING TO 4TH EMBODIMENT

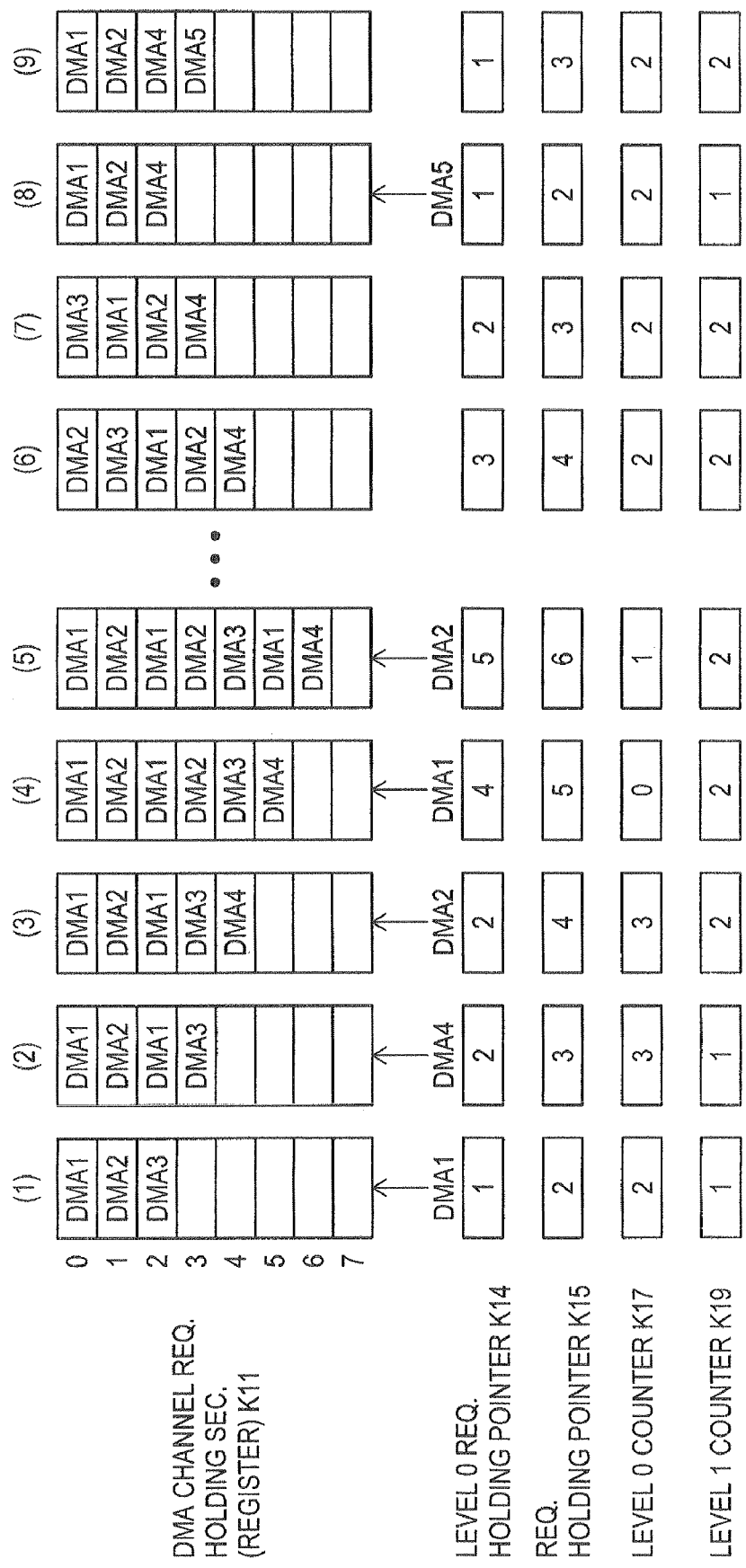
FIG. 17 DIAGRAM FOR ILLUSTRATING OPERATION ACCORDING TO 4TH EMBODIMENT

DATA TRANSFER CONTROL DEVICE AND DATA TRANSFER CONTROL METHOD

CROSS-REFERENCE TO RELATED APPLICATIONS

This application is based upon and claims the benefit of priority of the prior Japanese Patent Applications Nos. 2010-015766 and 2010-273835, respectively filed on Jan. 27, 2010 and Dec. 8, 2010, the entire contents of which are incorporated herein by reference.

FIELD

The embodiments discussed herein are related to a data transfer control device and a data transfer control method.

BACKGROUND

There have been known various technologies for higher memory access efficiency. For instance, there has been known a memory access device for realizing high transfer efficiency by concealing overhead in memory access, wherein memory access order per memory access request is not rearranged but command generation order per bank unit is rearranged. Further, there has also been known a data processing device for improving transfer efficiency and realizing higher speed data access, wherein, when an address stored in one buffer and an address stored in another buffer adjoining to the one buffer are compared and the comparison result indicates that successive transfer is possible, addresses and data stored in these buffers are sequentially transmitted to a destination device. Further, there has also been known a bus arbitration method for executing optimum bus arbitration depending on a use environment, wherein DMA request signals are rearranged in accordance with unique identification numbers, each associated with an order of priority and a DMA request signal highest in the priority of all the rearranged DMA request signals is selected.

Related technology is disclosed in Japanese Laid-Open Patent Publications Nos. 2006-260472, 2002-304365 and 2005-71186.

In the above-mentioned memory access device, priority control does not make any sense in case memory access order is rearranged in accordance to transfer address per bank unit, etc.

Further, as illustrated through image data transfers and the like from a digital still camera, in case of a DMA channel signal with fluctuations in the data transfer amount due to a mixture of periods with many memory access requests and periods with a few memory access requests, system failures could be caused by disruptions in data transfers associated with the DMA channel signal due to the relationship with data transfers associated with the other DMA channel signal.

SUMMARY

According to an aspect of the embodiments discussed herein, a data transfer control device that selects one of a plurality of DMA channels and transfers data to or from memory includes a request holding section configured to hold a certain number of data transfer requests of the plurality of DMA channels and a request rearranging section configured to select and rearrange the data transfer requests that are held in a basic transfer order so that the data transfer requests of each of the plurality of DMA channels are successively outputted for a number of successive transfers set in advance.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is an example diagram for illustrating operation of the request rearranging section SC1 and the request holding section K1;

FIG. 5 is a block diagram according to a second embodiment;

FIG. 6 is a block diagram according to a third embodiment;

FIG. 7 is a block diagram of request holding/rearranging section according to the third embodiment;

FIG. 8 is an explanatory diagram of operation at an inter-level arbitration section;

FIG. 9 is an explanatory diagram of operation at a channel decision section;

FIG. 10 is a block diagram of a priority flag generation section;

FIG. 15 is a pattern diagram for illustrating data transfer controlled by the first and second modifications for controlling issuance of level 1 request;

FIG. 16 is a (partial) block diagram according to a fourth embodiment; and

FIG. 17 is a diagram for illustrating operation according to the fourth embodiment.

DESCRIPTION OF EMBODIMENTS

Preferred embodiments of the present invention will be explained with reference to accompanying drawings.

Figure 1:
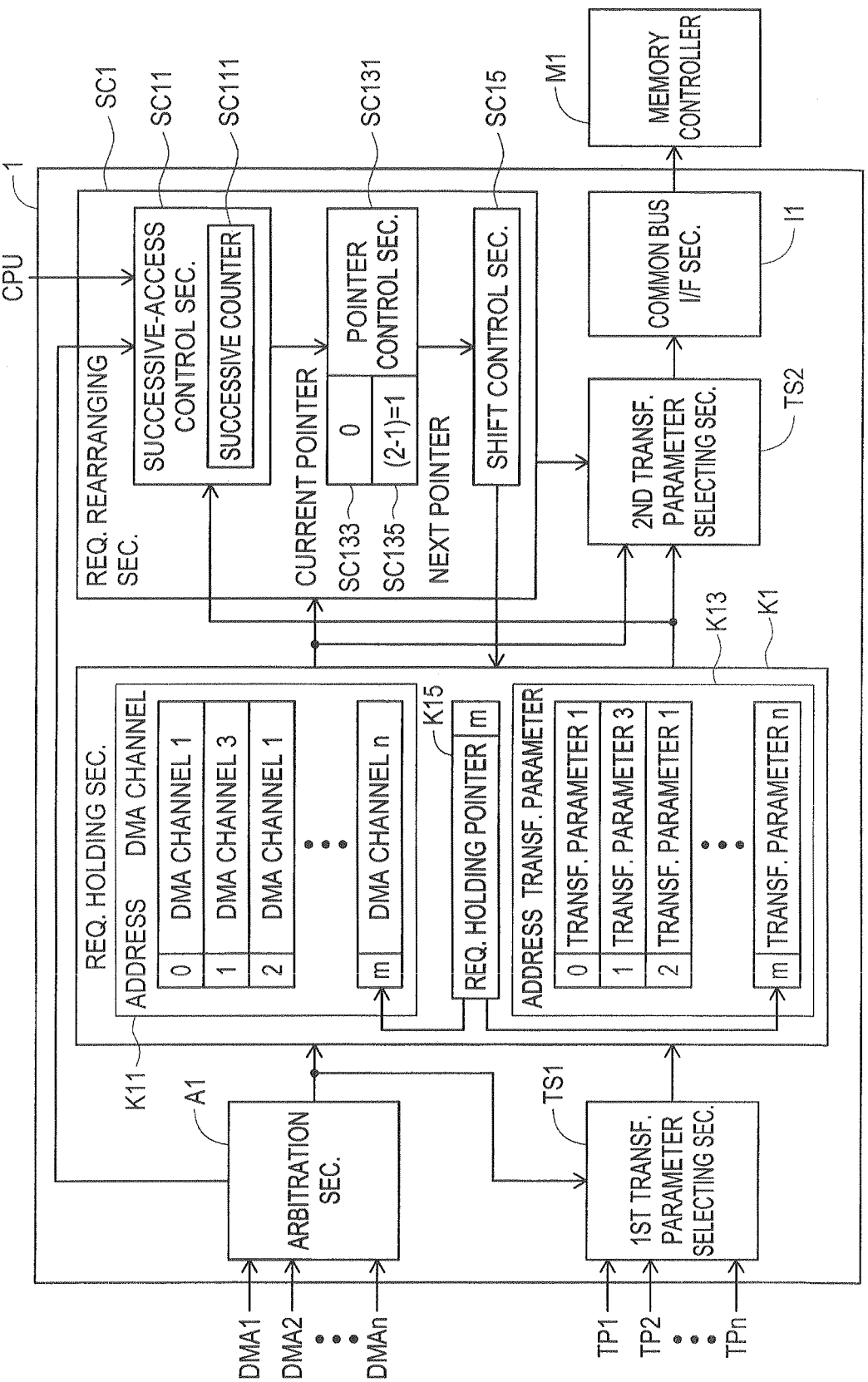
FIG. 1 is a block diagram according to a first embodiment.

FIG. 1 is a block diagram according to a first embodiment. A memory access control unit 1 includes an arbitration section A1, a first transfer parameter selecting section TS1, a request holding section K1, a request rearranging section SC1, a second transfer parameter selecting section TS2 and a common bus I/F section I1.

When a DMA access request to a memory is inputted in the memory access control unit 1 from an external device, a plurality of DMA channel signals DMA1 through DMAn are inputted to the arbitration section A1. Each of these DMA channel signals DMA1 through DMAn is a signal indicating a DMA channel number to which DMA access request is made. Further, a plurality of transfer parameter signals TP1 through TPn respectively corresponding to the DMA channel signals DMA1 through DMAn are inputted to the first transfer parameter selecting section TS1 from the exterior. Each of those transfer parameter signals TP1 through TPn is a signal indicating an address in memory subject to DMA access, an access method (read or write) and a successive transfer flag to be described later.

The arbitration section A1 submits arbitration with respect to concurrently-accepted DMA channel signals DMA1 through DMAn in accordance with a certain channel priority order. After arbitration with respect to the DMA channel signals, the arbitration section A1 outputs the DMA channel signals to the request holding section K1 and the first transfer parameter selecting section TS1. Thereafter the first transfer parameter selecting section TS1 outputs to the request holding section K1 transfer parameter signals corresponding to respective DMA channel signals inputted from the arbitration section A1.

The request holding section K1 includes a DMA channel request holding section K11, a transfer parameter holding section K13 and a request holding pointer K15. From the arbitration section A1 to the DMA channel request holding section K11, the DMA channel signals arbitrated by the arbitration section A1 are inputted. The transfer parameter holding section K13 is coupled to the first transfer parameter selecting section TS1 from which transfer parameter signals corresponding to arbitrated respective DMA channel signals are inputted to the transfer parameter holding section K13.

Both the DMA channel request holding section K11 and the transfer parameter holding section K13 independently include (m+1) of registers for addresses ranging from 0 to m. Activation of the registers of the DMA channel request holding section K11 and the registers of the transfer parameter holding section K13 is instructed by the request holding pointer K15. In each of the registers directed to addresses 0 through m provided in the DMA channel request holding section K11, DMA channel signals arbitrated at the arbitration section A1 in response to a transmission request from the exterior are stored and held in numerical order with respect to the numbers assigned to the addresses. In each of the registers directed to addresses 0 through m provided in the transfer parameter holding section K13, transfer parameter signals corresponding to DMA channel signals held in respective registers of the DMA channel request holding section K11 are stored and held in numerical order with respect to the numbers assigned to the addresses.

The request holding pointer K15 indicates the number of the largest numbered register's address holding a DMA channel signal among the registers of the DMA channel request holding section K11 and the number of the largest numbered register's address holding a transfer parameter signal among the registers of the transfer parameter holding section K13. That is, the request holding pointer K15 indicates a value obtained by subtracting 1 from the number of the DMA channel signals held in the DMA channel request holding section K11 at the transmission request and a value obtained by subtracting one from the number of the transfer parameter signals held in the transfer parameter holding section K13.

DMA channel signals outputted from the request holding section K1 are inputted to the request rearranging section SC1. Further, transfer parameter signals outputted from the request holding section K1 are inputted to the request rearranging section SC1 and the second transfer parameter selecting section TS2.

The request rearranging section SC1 includes a successive-access control section SC11, a current pointer SC133, a next pointer SC135, a pointer control section SC131 and a shift control section SC15.

From the request holding section K1 to the request rearranging section SC1, DMA channel signals are inputted.

The successive-access control section SC11 includes a successive counter SC111. From the arbitration section A1 and an external CPU to the successive-access control section SC11, a signal for controlling to make successive access from the same DMA channel to the memory disabled/enabled is inputted. Further, a transfer parameter is inputted from the request holding section K1. The transfer parameter includes a successive-transfer flag. Thereby, the successive-transfer flag may control to make successive access from the same DMA channel to the memory disabled/enabled.

For instance, in case of transferring image data, memory addresses to which respective channels get access are successive. Therefore, each channel is likely to get successive access within the same page in the memory. In case of successive access within the same page, the memory controller M1 may transfer data without pre-charge operation. Therefore, by rearranging requests per channel number and generating successive requests, efficient data transfer may be realized.

Information for judging necessity of successive access requests is given so as to instruct successive access requests from a CPU by previously associating requests with respective DMA channels or so as to dynamically instruct from the arbitration section A1 for successive access to high-priority channels.

In case of transferring image data, addresses are likely to be not successive at a horizontal-pixels turning over point or at local access within one frame. In such situations, the information of not successive access is generated so as to make the successive-transfer flag disabled concurrent with channel requests. Thereby, memory access operation may be changed from successive access to non-successive access. This successive-transfer flag is embedded in a transfer parameter and transferred from a master device.

For instance, in case batch data transfer is requested so as to avoid system failure due to time restriction of an external device such as data retention period of a CMOS sensor at image taking, successive data transfers may be realized by making the successive-transfer flag enabled.

Further, to ensure successive access to channels which have the similar priority order on average, or otherwise to avoid successive access to specific channels, the number of times successive accesses are allowed is set and controlled for each channel by the successive counter SC111. This may make it possible to realize application-tailored arbitration and regulate high efficiency access.

The pointer control section SC131 controls the current pointer SC133, the next pointer SC135 and the shift control section SC15 in accordance with a control signal sent from the successive access control section SC11.

The current pointer SC133 indicates the target registers of the DMA channel request holding section K11 and the transfer parameter holding section K13. The DMA channel signal and the transfer parameter signal stored in the target registers specified by the current pointer SC133 are then selected by the second transfer parameter selecting section TS2.

Similarly with the current pointer SC133, the next pointer SC135 indicates the target registers of the DMA channel request holding section K11 and the transfer parameter holding section K13. In case the register in the request holding section K11 stores the DMA channel number which is identical with the DMA channel number stored in the target register specified by the current pointer SC133, the next pointer SC135 shows an address with a value obtained by subtracting 1 (one) from the address of that register. Alternatively, in case the register in the DMA channel request holding section K11 does not store the DMA channel number which is identical with the DMA channel number stored in the target register specified by the current pointer SC133, the next pointer SC135 shows 0.

The transfer parameter signal and the DMA channel signal stored at the address specified by the current pointer SC133 are both outputted to the second transfer parameter selecting section TS2. Thereafter, the pointer control section SC131 controls the shift control section SC15 and causes it to shift the contents of the registers held in the DMA channel request holding section K11 and the transfer parameter holding section K13 to a register with an address value lower by 1.

Thereafter, the pointer control section SC131 over-writes the value held in the next pointer SC135 in the current pointer SC133. Thus, successive DMA access requests from the same DMA channel become possible under the control of the pointer control section SC131. The associated operation is described in more detail later.

The second transfer parameter selecting section TS2 receives the transfer parameters from the request holding section K1 and the value of the current pointer SC133 from the request rearranging section SC1. The second transfer parameter selecting section TS2 determines the transfer parameters to be outputted to the common bus I/F section I1 based on the value received from the current pointer SC133 and carries out the output operation.

The common bus I/F section I1ls coupled to an external memory controller M1 and outputs DMA access requests to the memory controller M1 based on the received transfer parameters. The memory controller M1 separates the bus protocol request acceptance sequence and the data transfer sequence and executes the request acceptance sequence irrespective of the execution status of the data transfer sequence.

Figure 2:
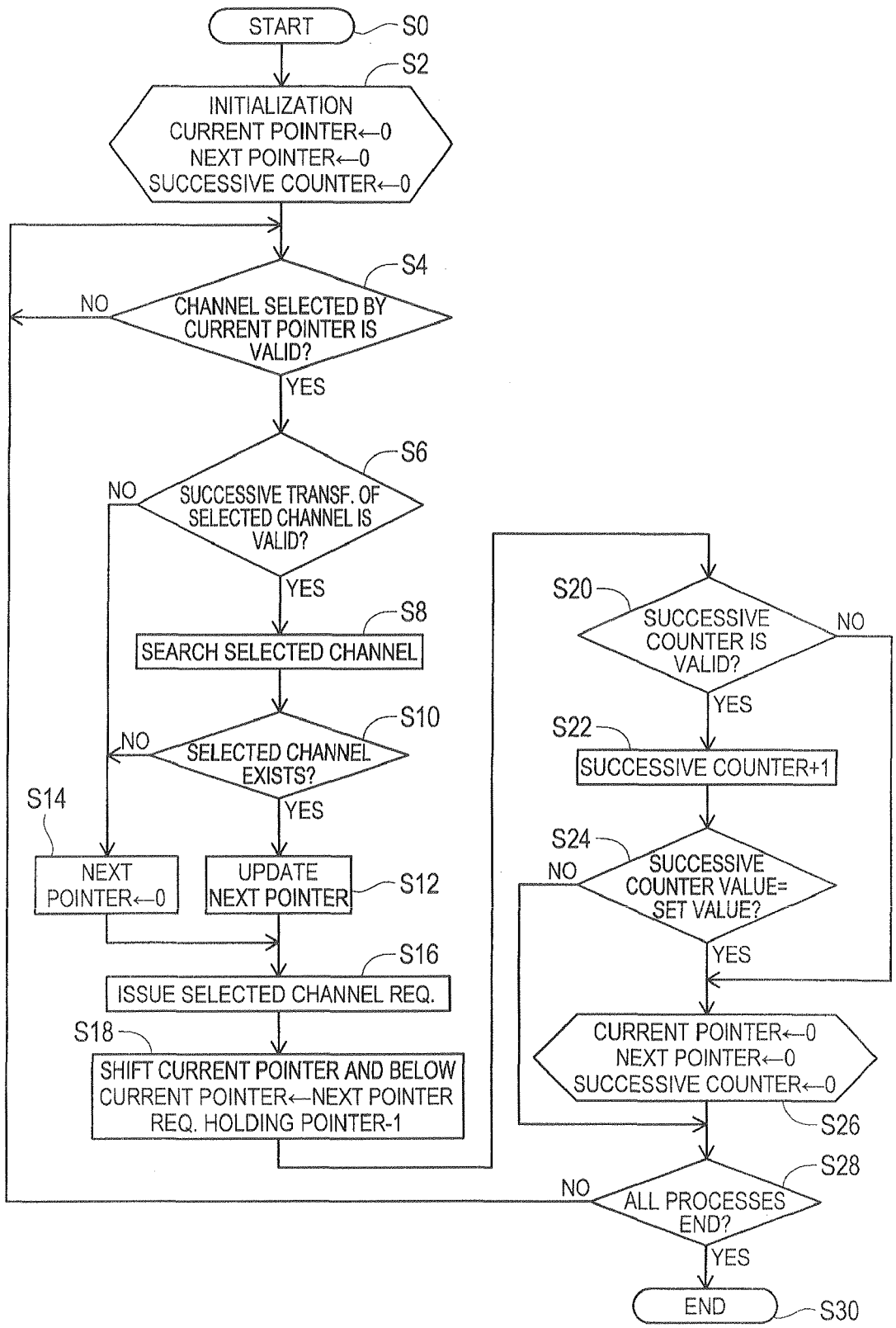
FIG. 2 is an operation flowchart of a request rearranging section SC1.
Figure 3:
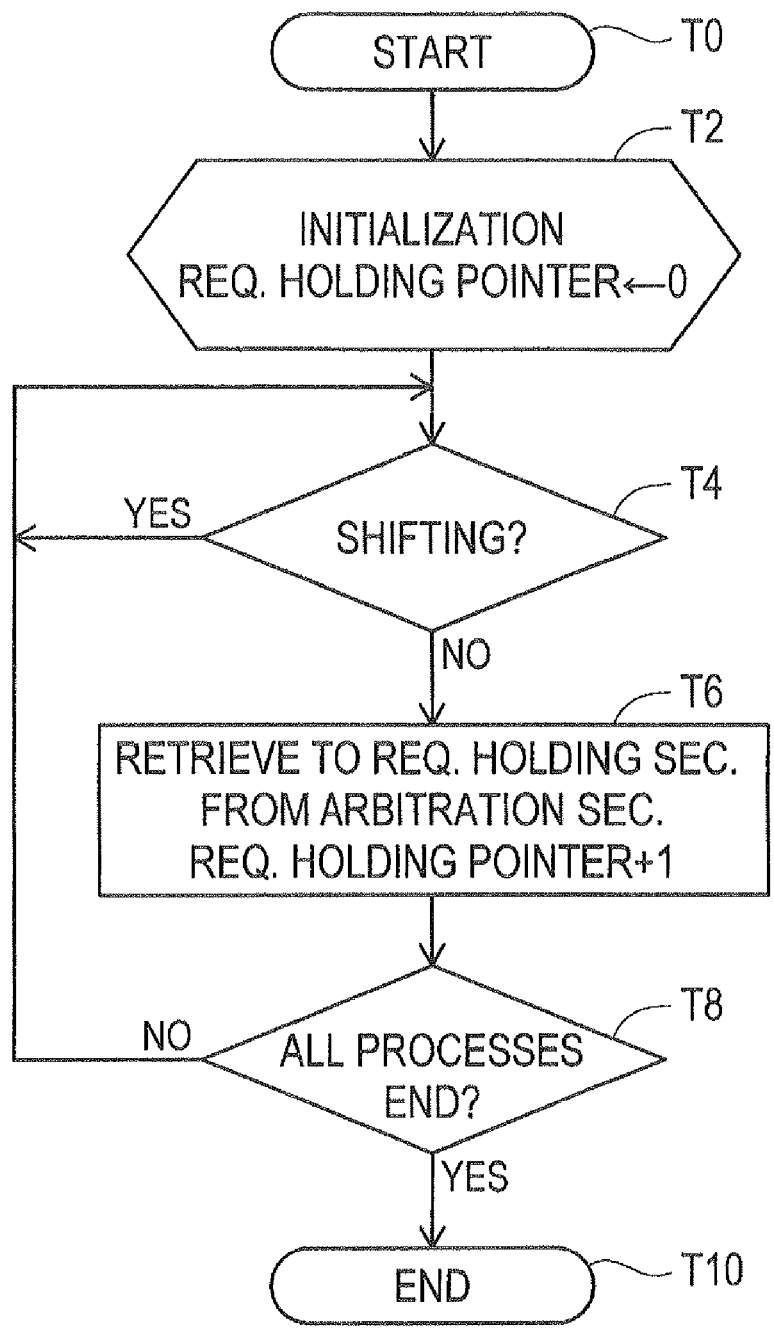
FIG. 3 is an operation flowchart of a request holding section K1.

FIG. 2 shows the operation flowchart of the request rearranging section SC1. FIG. 3 shows the operation flowchart of the request holding section K1. FIG. 4 is a specific example diagram for illustrating the operation flowcharts shown in FIG. 2 and FIG. 3. The request rearranging section SC1 starts operating (S0). The current pointer SC133, the next pointer 135 and the successive counter SC111 are initialized and set to 0 (S2).

In case the channel specified by the DMA channel signal held in the DMA request holding section K11 and selected by the current pointer SC133 is a valid channel (S4: YES), the successive transfer flag of the DMA channel (hereinafter, selected channel) specified by the DMA channel signal selected by the current pointer SC133 is checked (S6). In case the selected channel is not a valid channel (S4: NO), the status of the selected channel is checked again (S4). In case the successive transfer flag is valid (S6: YES), a search is conducted among the DMA channels stacked in the DMA request holding section K11 for a channel identical with the selected channel (S8). In case the successive transfer flag is invalid, Operation S14 is executed next (S6: NO). In case there is a selected channel (S10: YES), a value obtained by subtracting 1 from a coincident address value is stored and updated in the next pointer SC135 (S12). In case no selected channel is found among the request channels stacked in the DMA request holding section K11 (S10: NO), the value in the next pointer SC135 is updated to 0 (S14).

The memory access control unit 1 issues, with respect to the memory controller M1, a request with respect to the DMA channel signal stored in the DMA request holding section K11 of the request holding section K1 as instructed by the current pointer SC133 and outputs the request to the second transfer parameter selecting section TS2 (S16). In the next operation, the contents of the registers with an address value higher than the address held in the current pointer SC133 of the request holding section K1 are shifted to registers with an address value lower by "1". Also, the value of the next pointer SC135 is updated in the current pointer SC133. As the request issuance operation with respect to the selected channel is completed, "1" is subtracted from the value of the request holding pointer K15 in the request holding section K1 (S18).

Next, the activation status of the successive transfer flag included in the successive parameter, stored in the transfer parameter holding section K13 and specified by the current pointer SC133, is checked (S20). In case the successive transfer flag is enabled (S20: YES), "1" is added to the successive counter SC111 (S22). In case the successive transfer flag is not enabled (S20: NO), the flow moves to the next operation to be described later (S26).

Following Operation S22, the value of the successive counter SC111 is checked to determine whether it is less than a set value (S24). If the value of the successive counter SC111 is equal to the set value (S24: YES), the current pointer SC133, the next pointer SC135 and the successive counter SC111 are all initialized and reset to 0 (S26). If the value of the successive counter SC111 is less than the set value (S24: NO), the flow moves to the next process to be described later (S28).

Finally, the completion status of all the processes is checked (S28). In case no requests are held in the request holding section K1, for example, it is determined that all processes have been completed (S28: YES). Thereafter, the processes are ended (S30). In case not all processes have been completed (S28: NO), the flow reverts back to Operation 54.

FIG. 3 shows the flow chart of the request holding section K1. The request holding pointer K15 is shared by the request rearranging sections SC1 and request holding section K1.

Once the request holding section K1 starts operating (T0), the contents of the request holding pointer K15 are initialized and their value is set to 0 (T2). In case the request holding section K1 is not in the process of shifting (T4: NO), the DMA channel signal requesting data transfer is retrieved from the arbitration section A1 to the request holding section K1 and "1" is added to the value of the request holding pointer K15 (T6). In case the request holding section K1 is in the process of shifting (T4: YES), the system is on stand-by until the shift operation is completed. In case DMA channel signals requesting data transfers are continuously inputted from the arbitration section A1 (T8: NO), the flow reverts back to Operation T4. In case no DMA channel signals requesting data transfers are inputted from the arbitration section A1, it is determined that all processes have been completed (T8: YES), and the processes are ended (T10).

The flow charts shown in FIG. 2 and FIG. 3 as described above are described by way of a specific example diagram shown in FIG. 4.

In FIG. 4, the DMA request holding section K11 contains eight registers and holds DMA channel signals in register addresses 0 through 7 in accordance with the arbitration results from the arbitration section A1. For example, each of the registers with addresses 0 through 7 holds a DMA channel signal showing DMA channel 1, 2, 1, 3, 2, 1, 4 and 2, respectively. Accordingly, value "7" is retained in the request holding pointer K15. The current pointer SC133 and the next pointer SC135 each retain value "0" and value "1" (=2−1), respectively.

At Operation S4 it is determined whether the DMA channel signal (indicating DMA channel 1) held in the register of the DMA request holding section K11 with address value "0" as retained in the current pointer SC133 is a valid channel.

Let's assume successive transfers for the DMA channel 1 which represents the DMA channel signal as selected by the current pointer SC133 is valid (FIG. 2, S6: YES). In this case, at Operation S8, the pointer control section SC131 searches the registers with an address value equal to or higher than address 1 in the DMA channel request holding section K11 to determine whether the DMA channel signal showing the DMA channel 1 is held in section K11. As a result, it is determined that the DMA channel signal showing the DMA channel 1 is held in the register with address value "2" (FIG. 2, S10: YES). At Operation S12, the pointer control section SC131 stores in the next pointer SC135 value "1" which is obtained by subtracting "1" from the address value "2".

At Operation S16, the DMA channel signal showing the DMA channel 1 stored in the register with address 0 in the DMA channel request holding section K11 is outputted to the second transfer parameter selecting section TS2.

As a result of the output operation, the register with address 0 in the DMA channel request holding section K11 is cleared. At Operation S18 (1), the shift control section SC15 moves the DMA channel signals stored at addresses 1 through 7 in the DMA channel request holding section K11 one by one to registers with lower address values, so as to fill the empty register with address 0.

At Operation S18 (2), the value of the next pointer SC135 is overwritten in the current pointer SC133. The current pointer SC133 indicates the register with address value "1". At this time, the DMA channel signal showing DMA channel 1 is stored in the register with address 1. Thereafter, the DMA channel signal to be transferred from the DMA channel request holding section K11 to the second transfer parameter selecting section TS2 is the DMA channel signal showing again the DMA channel 1. As a result, access with respect to the DMA channel 1 is executed successively.

The shift process is carried out after the DMA channel signal stored in the DMA channel request holding section K11 is transferred to the second transfer parameter selecting section TS2. Accordingly, with respect to the registers held in the DMA channel request holding section K11, the maximum value of the addresses for the registers holding DMA channel signals decreases by "1", from 7 to 6, and accordingly, the value of the request holding pointer K15 is also updated to 6.

At Operation T6, once a new DMA channel signal is inputted to the arbitration section A1, a newly arbitrated DMA channel signal is outputted from the arbitration section A1 to the DMA channel request holding section K11. In this case, the relevant DMA channel signal is stored in the register with the lowest address value among the empty registers held in the DMA channel request holding section K11, and the value of the request holding pointer K15 is increased by "1".

The effects of the first embodiment are now described. For instance, in case of memory access through burst transfers in image data transfers, it is very likely that successive access to the same channel happens within the same page. In the case of some channels which are high in the priority order, transfers may be carried out in burst sizes which are smaller than the relevant data transfer sizes, in accordance with the requested data size. In this case, the requests which are issued are segmented into burst-size units. Once the segmented requests start being accepted in a discontinuous fashion, memory access efficiency is likely to decrease.

With respect to the above, the request rearranging section SC1 rearranges requests of channel numbers which differ depending on the access in the request holding section K1 to be successive requests which have been rearranged for each channel number. Accordingly, this makes it possible to issue bulk requests for channels which are high in the priority order which have been received in a discontinuous fashion, helping realize highly efficient data transfers.

The current pointer SC133 and the next pointer SC135 are controlled by the pointer control section SC131. Of the registers held in the DMA channel request holding section K11 and the transfer parameter holding section K13, the current pointer SC133 indicates the address of the register storing the transfer parameter and the DMA channel signal which are being transmitted at present. Of the registers held in the DMA channel request holding section K11 and the transfer parameter holding section K13, the next pointer S135 indicates the address of the register storing the transfer parameter and the DMA channel signal which are to be transferred at the time of the next transfer. At this time, the request rearranging section SC1 may swiftly issue selected channel request under the control of the current pointer SC133 and next pointer SC135.

The DMA channel request holding section K11 and the transfer parameter holding section K13 hold the DMA channel signals and the transfer parameter signals arbitrated in the arbitration section A1 in registers organized in the numerical order of their address. The DMA channel request holding section K11 and the transfer parameter holding section K13 issue the DMA channel signal and the transfer parameter signal to the second transfer parameter selecting section TS2 and thereafter carry out a shift operation. In this operation, registers which have become empty as a result of signal issuance are filled. In case the memory access control unit 1 successively issues data transfer requests for the similar DMA channel, the next pointer SC135 holds the address value considering the shift in the value of the address following the shift operation. The memory access control unit 1 issues data transfer requests, and thereafter overwrites the address value held in the next pointer SC135 as the address value of the current pointer SC133, which enables swift issuance of the next data transfer requests.

The number of times successive accesses are made to channels is set for each signal in advance and each time a process is carried out, "1" is added to the successive counter SC111 per the access, and then the value of the successive counter SC111 is compared with a set value. If the value of the successive counter SC111 is equal to the set value, the flow transitions to the next channel in the priority order. This makes it possible to ensure that channels which have the similar priority order are accessed successively on average, or otherwise that a specific channel alone is not accessed successively.

Then, channel numbers are searched while referring to the successive transfer flag included in the successive parameter held as a set together with the channel number, and even if the similar channel number is contained in the DMA channel request holding section K11, the flow transitions to the channel which comes next in the priority order unless the successive transfer flag is enabled.

For instance, if the addresses of the stored data becomes discontinuous due to processing the transition to the left margin of the next line from the right margin in the image scanning at the time of image data transfers, the DMA channel disables the successive transfer flag and the flow transitions to the DMA channel which comes next in the priority order. This makes it possible to prevent a decrease in transfer efficiency.

In case a specific DMA channel requests a bulk transfer, the arbitration section A1 sets the DMA channel so that its priority becomes higher, which increases the transfer occurrence ratio in the request holding section K1. Furthermore, it also sets the successive transfer flag included in the transfer parameters transmitted in the specific DMA channel where the bulk transfer is requested to be enabled. In the specific DMA channel, the value of the successive counter SC111 is set to a higher value as compared to the DMA channel which does not request a bulk transfer. The settings of the successive transfer flags and the successive counter SC111 enable successive data transfers in the DMA channels which request bulk transfers, which improves transfer efficiency. Even in case of a situation where successive data transfer requests may not be issued in a specific DMA channel which requests a bulk data transfer, transfers in the DMA channels down in the priority order may still be carried out, which means that transfer efficiency does not decrease.

Control of successive access in a specific DMA channel may be realized when the arbitration section A1 sets a successive transfer flag with respect to the DMA channels with higher priority. Control of successive access may also be realized when the DMA channel itself dynamically sets the successive transfer flag in response to the transfer status of each DMA channel. Moreover, successive access may also be dynamically controlled in accordance with the transfer status and so on in the entire system by setting the successive access control section SC11 using an exterior CPU.

FIG. 5 shows a second embodiment. A circuit according to the second embodiment has a read access control section 1A, a write access control section 1B and a read/write arbitration section RWA. The read access control section 1A and the write access control section 1B represent the memory access control unit 1 according to the first embodiment. A common bus I/F section I1 of the read access control section 1A and a common bus I/F section I1 of the write access control section 1B are coupled to the read/write access arbitration section RWA. The read/write access arbitration section RWA is coupled to a memory controller M1 though a read bus and a write bus.

Also, the read/write access arbitration section RWA is coupled to a CPU or a request holding section K1 or a request rearranging section SC1 of the read access control section 1A and the write access control section 1B.

In the second embodiment, the memory controller M1 is coupled in a bus configuration wherein the path for read access is separated from the path for write access. Transfer efficiency may be improved when transfers are carried out in this connection configuration by more than a fixed number of either one of successive read accesses or write accesses, as compared to the case when read accesses and write accesses are carried out alternately.

The read/write access arbitration section RWA is controlled through instructions received from the CPU, or information from the request holding section K1 or the request rearranging section SC1 of the read access control section 1A and the write access control section 1B.

During the period of time that either one of a read access and write access is carried out, the other one of the read access and write access is disabled, which thus allows read accesses or otherwise write accesses to be carried out successively at the memory controller M1 level.

Next, an example of control in the second embodiment is now described. In image data transfers, the ratio of data amount to which read access is made and data amount to which write access is made may change in accordance with the type of application, such as image expansion/contraction. In this case, control of the read/write access arbitration section RWA is carried out so that transfers are made successively through either one of the read accesses or write accesses with priority over the other, based on the data amount ratio corresponding to that particular application.

Otherwise, control of the read/write access arbitration section RWA is carried out so that transfers are made successively through either one of read accesses or write accesses with priority over the other, based on the ratio of number of access requests as held in the request holding section K1. The above controls enable high efficiency transfers.

FIG. 6 is a block diagram according to a third embodiment. The memory access control unit 1C has request holding/rearranging sections 11A and 11B, an inter-level arbitration section 13, a channel decision section 15, a priority flag generation section 17, AND logical circuits AND1 and AND2 and a common bus I/F section I1.

According to the first embodiment (FIG. 1) the request holding/rearranging sections 11A and 11B each have an arbitration section A1, a first transfer parameter selecting section TS1, a request holding section K1, a request rearranging section SC1 and a second transfer parameter selecting section TS2. Here, the processes with respect to the transfer parameter signals TP1 through TPn are similar to in the first embodiment. Therefore, further explanation thereof in the third embodiment is omitted and a description is given using the DMA channel signal as an example. In this case in particular, a description is given using the DMA channel signals DMA1 through DMA5 as examples.

The memory access control unit 1C includes request holding/rearranging sections 11A and 11B. They are provided for each priority level set in the DMA channels. The request holding/rearranging section 11A receives DMA channels signals DMA1 and DMA2 which have a high priority level (level 0). The request holding/rearranging section 11B receives DMA channels signals DMA3 through DMA5 which have a priority level lower than the level 0 (level 1).

The request holding/rearranging sections 11A and 11B each output, respectively, selected DMA channel signals SNL0 and SNL1 which are DMA channel signals selected by the request rearranging section SC1, successive transfer completion signals SLL0 and SLL1 which indicate that the last of the successive transfers from the request rearranging section SC1 is completed, and validity signals SEL0 and SEL1 indicating the presence or absence of selected DMA channel signals SNL0 and SNL1 to be outputted.

FIG. 7 illustrates a block diagram of the request holding/rearranging sections 11A and 11B. Other than the fact that the selected DMA channel signals SNL0 and SNL1, the successive transfer completion signals SLL0 and SLL1 and the validity signals SEL0 and SEL1 are outputted, the request holding/rearranging sections 11A and 11B have the similar circuit elements as the memory access control unit 1 according to the first embodiment (FIG. 1).

In the request holding/rearranging sections 11A and 11B, the selected DMA channel signals SNL0 and SNL1 are outputted from the second transfer parameter selecting section TS2. The DMA channel signal is determined based on the value of the current pointer SC133 which is inputted from the request rearranging section SC1 and is outputted as the selected DMA channel signals SNL0 and SNL1. The successive transfer completion signals SLL0 and SLL1 are outputted from the successive access control section SC11. The number of times successive transfers are made in a channel is set in advance for each channel, and each time a transfer is carried out, "1" is added to the successive counter SC111. The successive transfer completion signals SLL0 and SLL1 are outputted when the value of the successive counter SC111 reaches a value indicating the last of the successive transfers. Validity signals SEL0 and SEL1 are outputted from the pointer control section SC131. Next it is determined whether the DMA channel signal held in the register of the DMA request holding section K11 at the address which is contained in the current pointer SC133 is valid, and if it is determined that it is valid, validity signals SEL0 and SEL1 are outputted.

A further explanation of FIG. 6 is now given. In case the inter-level arbitration section 13 indicates that there is a valid request for either one of the validity signals SEL0 and SEL1, a validity signal indicating that there is a valid request is outputted as an inter-level arbitration signal SAL0. If it indicates that both validity signals SEL0 and SEL1 are valid requests, for example, validity signals SEL0 and SEL1 are competing, the inter-level arbitration section 13 selects either one of the validity signals in accordance with the priority flag SPL0 (to be described later) which is outputted from the priority flag generation section 17 and outputs it as the inter-level arbitration signal SAL0. For example, in accordance with the priority flag SPL0, the inter-level arbitration section 13 selects validity signal SEL0 in the case level 0 is given priority, and validity signal SEL1 in the case level 1 is given priority.

FIG. 8 is an explanatory diagram of the operation in the inter-level arbitration section 13. The priority flag SPL0 with value "0" indicates that level 0 is given priority, while the priority flag SPL0 with value "1" indicates that level 1 is given priority. Validity signals SEL0 and SEL1 with value "1" indicate that the selected DMA channel signals SNL0 and SNL1 have been outputted and there is a request for transfer in the DMA channel, while value "0" indicates that there is no request.

Accordingly, in case both validity signals SEL0 and SEL1 are at value "1", this indicates that requests are competing for level 0 and level 1. In this case, the inter-level arbitration section 13 selects the validity signal SEL0 in accordance with the priority flag SPL0 at value "0", and validity signal SEL1 in accordance with the priority flag SPL0 at value "1", as indicated in the selection result.

The channel decision section 15 generates enable signals ENL01 and ENL02 which show whether the bus usage right is established with respect to the selected DMA channel signals SNL0 and SNL1 in accordance with the inter-level arbitration signal SAL0 and the validity signal SEL1. The selected DMA channel signal is outputted as established DMA channel signal SD to the common bus I/F section I1.

FIG. 9 is an explanatory diagram of the operation in the channel decision section 15. The inter-level arbitration signal SAL0 with value "1" shows that the selected DMA channel signal SNL0 with priority level 0 is valid, for example there is an associated request for transfer. As a result, the selected DMA channel signal SNL0 is outputted as the established DMA channel signal SD and the bus usage right is established. In the case the inter-level arbitration signal SAL0 has value "0" and the validity signal SEL1 has value "1", the selected DMA channel signal SNL1 having priority level 1 is valid, which means there is an associated request for transfer. As a result, the selected DMA channel signal SNL1 is outputted as established DMA channel signal SD and the bus usage right is established.

The enable signals ENL01 and ENL02 are each inputted to the AND logical circuits AND1 and AND2, respectively. The AND logical circuits AND1 and AND2 also receive successive transfer completion signals SLL0 and SLL1, respectively at their other inputs. The AND logical circuits AND1 and AND2 each execute logical AND operations between the enable signals ENL01 and ENL02 and the successive transfer completion signals SLL0 and SLL1. As a result, a first enable signal ENLL01 and a second enable signal ENLL02 are outputted. The first enable signal ENLL01 and the second enable signal ENLL02 are each selected at the request holding/rearranging sections 11A and 11B so as to be successively transferred and are outputted at the time of the last successive transfer with respect to the DMA channel signal for which the bus usage right has been established at the channel decision section 15.

The priority flag generation section 17 generates priority flag SPL0 showing which one of the selected DMA channel signals SNL0 and SNL1 is given priority in the case the selected DMA channel signals SNL0 and SNL1 which are selected at the request holding/rearranging sections 11A and 11B respectively are competing for priority. Accordingly, in case neither of the selected DMA channel signal SNL0 or SNL1 is outputted, the selected DMA channel signal to be outputted is then selected.

The first enable signal ENLL01 and the second enable signal ENLL02 are inputted to the priority flag generation section 17. The first enable signal ENLL01 is outputted at the time the successive transfers of DMA channel signals having priority level 0 continue and the bus usage right has been established with respect to the last one of the successive transfers thereof. The second enable signal ENLL02 is outputted at the time the successive transfers of DMA channel signals having priority level 1 continue and the bus usage right has been established with respect to the last one of the successive transfers thereof. The priority flag generation section 17 has a counting function and counts the number of times the bus usage right has been established. Moreover, the priority flag generation section 17 generates a priority flag SPL0 based on each count value, respectively.

Priority flag SPL0 is a two-value signal, for instance. In case of the first value (for instance, "0"), the flag indicates that the DMA channel having priority level 0 is given priority, whereas in case of the second value (for instance, "1"), the flag indicates that the DMA channel signal having priority level 1 is given priority.

FIG. 10 is a block diagram of the priority flag generation section 17. The priority flag generation section 17 includes a counter control section 171, a selection section 172, a counter 173 and a flag control section 174. Counter 173 includes a first counter 173a and a second counter 173b. Both counters 173a and 173b are up counters, for instance. A count-up value is set as a set value in each of the counters 173a and 173b, by a CPU or the like. The count-up values set in the first counter 173a and the second counter 173b, respectively are set in accordance with the count number of the first enable signal ENLL01 and the count number of the second enable signal ENLL02. The count-up values are "4" and "3", for instance, respectively. Both counters 173a and 173b carry out a count-up operation (+1 operation) in response to the count-up signal outputted from the counter control section 171. Moreover, once the count-up values for which the count values are set coincide, counters 173a and 173b respectively output a coincidence signal to the counter control section 171 and clear the count value (reset it to "0").

The first enable signal ENLL01 and the second enable signal ENLL02 are both inputted to the counter control section 171. The counter control section 171 outputs a count-up signal to the first counter 173a in response to the first enable signal ENLL01 and a count-up signal to the second counter 173b in response to the second enable signal ENLL02. The count value of the first counter 173a indicates the number of sets indicating the number of times the successive transfers as selected in the request rearranging section SC1 are repeated as one set in the established DMA channel signal SD having priority level 0. The count value of the second counter 173b indicates the number of sets indicating the number of times successive transfers as selected in the request rearranging section SC1 are repeated as one set in the established DMA channel signal SD having priority level 1.

The counter control section 171 outputs to the flag control section 174 a flag control signal based on the coincidence signal which is outputted from either one of the counters 173a or 173b. The flag control section 174 generates a priority flag SPL0 in response to the flag control signal. In more detail, the counter control section 171 causes the flag control section 174 to output a priority flag SPL0 having priority level 0 (for instance value "0") in response to the flag control signal while causing the first counter 173a to perform a count-up operation in response to the first enable signal ENLL01. Once the validity signals SEL0 and SEL1 are both outputted, the inter-level arbitration section 13 selects validity signal SEL0 having priority level 0 in response to the priority flag SPL0 with value "0". Moreover, the inter-level arbitration section 13 outputs an inter-level arbitration signal SAL0 indicating that arbitration has been performed between priority levels of validity signals SEL0 and SEL1.

Once the first counter 173a outputs the coincidence signal, the counter control section 171 causes the flag control section 174 to output priority flag SPL0 having priority level 1 (for instance value "1") in response to the flag control signal. Once the validity signals SEL0 and SEL1 are both outputted, the inter-level arbitration section 13 selects validity signal SEL1 having level 1 priority in response to priority flag SPL0 with value "1". Moreover, the inter-level arbitration section 13 outputs an inter-level arbitration signal SAL0 indicating that arbitration has been performed between priority levels of validity signals SEL0 and SEL1.

The inter-level arbitration section 13 outputs a certain number of sets of requests, including successive transfers of level 0 requests which are outputted as a set and successive transfers of level 1 requests which are outputted as a set, the number of transfers being equal to the count values set in the first counter 173a and second counter 173b, respectively, of the priority flag generation section 17. For example, the inter-level arbitration section 13 allows successive request transfers between level 0 and level 1 in accordance with a count value ratio set in the first counter 173a and second counter 173b.

Figure 11:
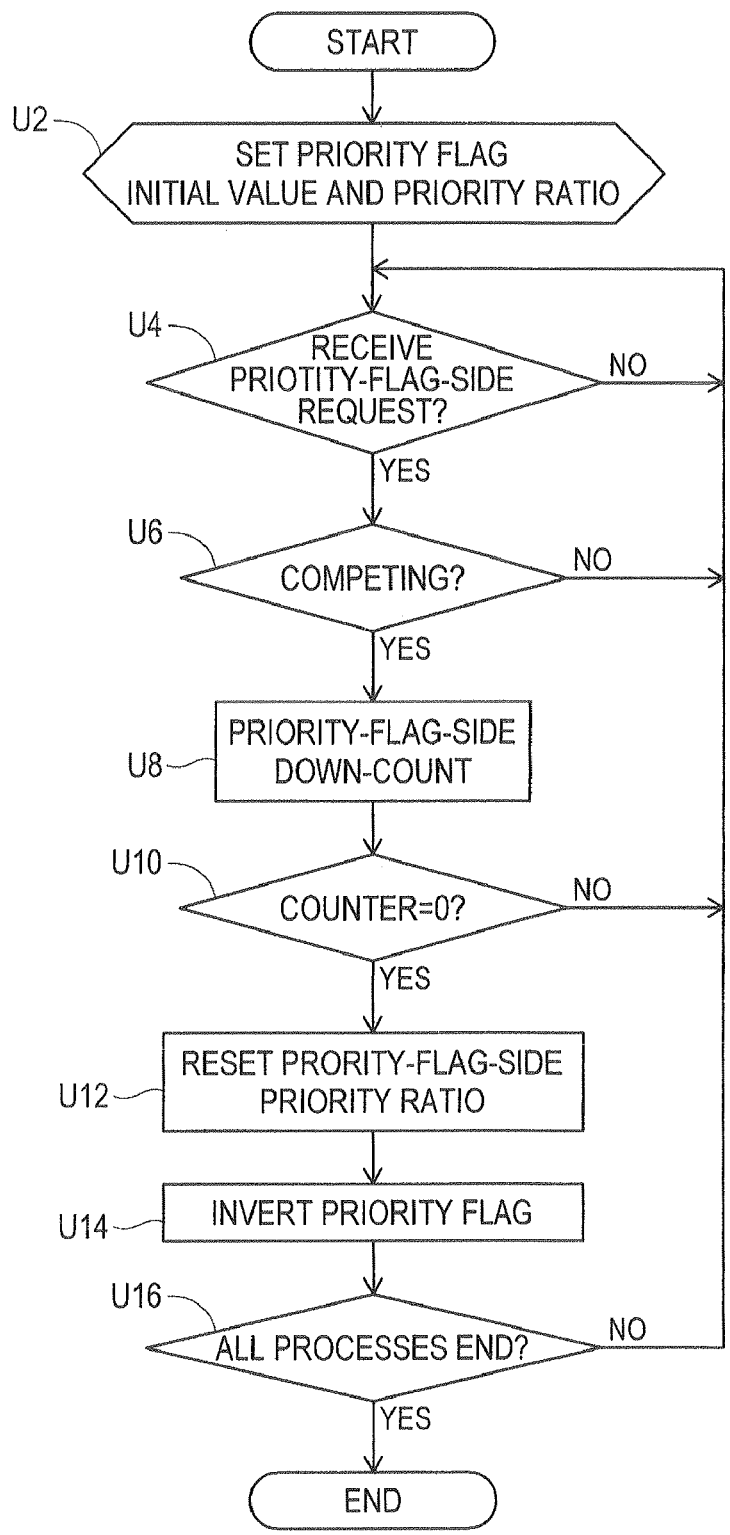
FIG. 11 is a flowchart for illustrating operation of a priority flag generation section.

FIG. 11 is a flow chart illustrating the operations executed in the priority flag generation section 17. First, the priority flag initial value and the priority rate (count value) are set (U2). Next, it is determined whether a priority flag side request exists with respect to the level which is given priority at that time (U4) and thereafter, if any requests exist, it is determined whether the requests are competing for priority (U6). In case they are competing, the count values on the priority flag side are down counted (U8). Next, it is determined whether the count value is "0", for example, whether the set number of requests has been accepted (U10). In case the count value is "0", the priority ratio on the priority flag side, for example the count value, is re-set (U12). Next, the priority flag is changed so as to invert the priority flag, for example, to switch the priority level (U14). Moreover, it is determined whether all operations in one service are completed (U16) and in case they are not completed, the flow reverts back to Operation U4.

Figure 12:
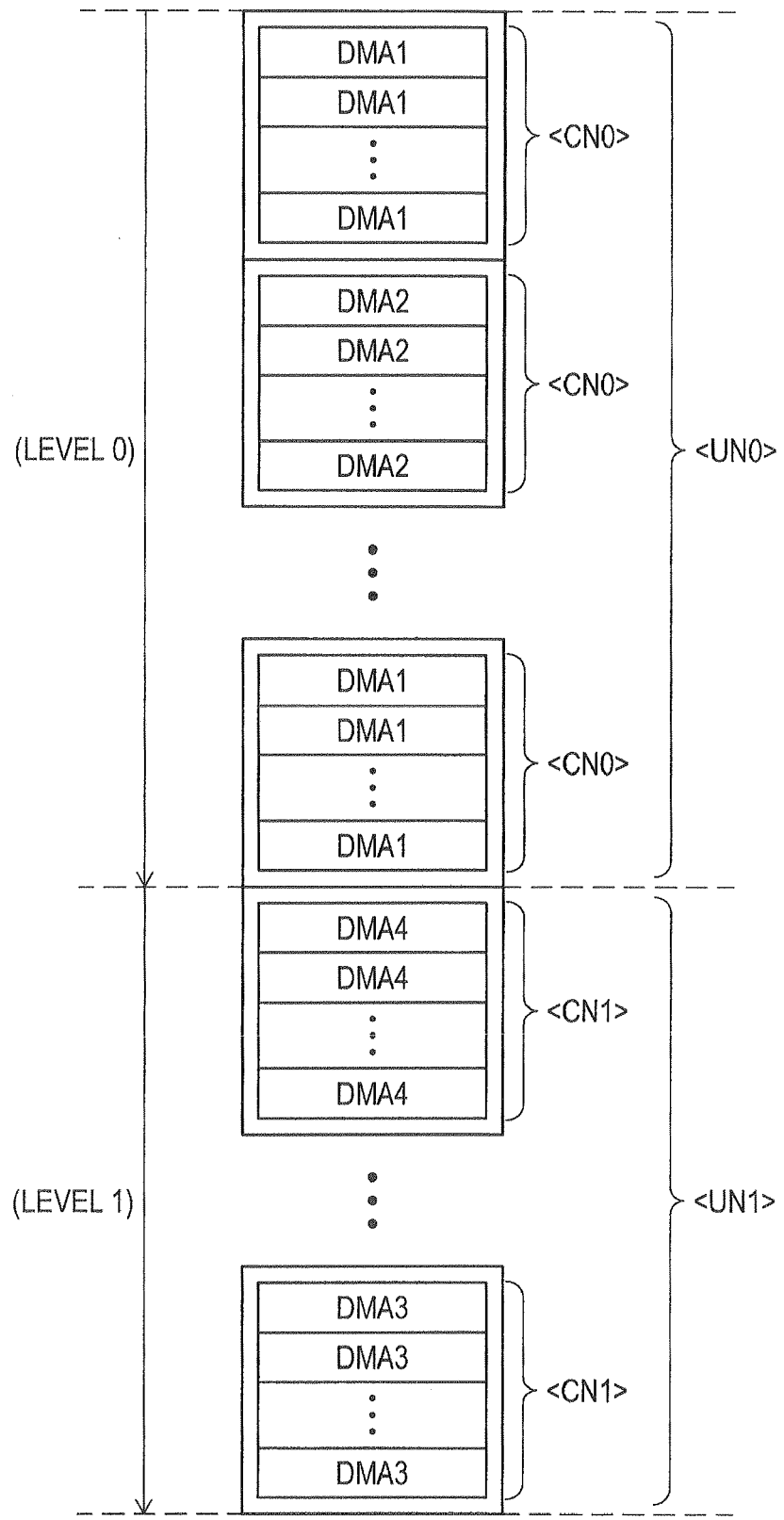
FIG. 12 is an example of request issuance according to the third embodiment.

FIG. 12 is an example of request issuance for the case a DMA channel signal transfer has occurred according to a third embodiment. The number of successive transfers for each DMA channel signal is set to <CN0> in the request rearranging section of the request holding/rearranging section 11A. At the same time, the number of successive transfers for each DMA channel signal is set to <CN1> in the request rearranging section of the request holding/rearranging section 11B. The count value in the first counter 173a of the priority flag generation section 17 is set to <UN0>, while the count value in the second counter 173b of the priority flag generation section 17 is set to <UN1>. Sets of successive transfers of DMA channel signals having level 0 priority are executed for <UN0> times, while sets of successive transfers of the DMA channel signals having level 1 priority are executed for <UN1> times.

In FIG. 12 transfers start with the DMA channel signals having level 0 priority. First, the DMA channel signal DMA1 is selected, and successive transfers are carried out for <CN0> times. Next, the DMA channel signal DMA2 is selected, and successive transfers are carried out for <CN0> times. More precisely, respective successive transfers occur as a set and sets of successive transfers occur <UN0> times. Thereafter, the DMA channel signal having level 1 priority is transferred. First, the DMA channel signal DMA4 is selected, and successive transfers are carried out for <CN1> times. More precisely, respective successive transfers occur as a set, and sets of successive transfers are carried out <UN1> times. Here, the respective DMA channel signals are selected in the order of basic transfer as stored in the request holding section, as earlier described in the first embodiment.

According to the third embodiment, in case the priority level is divided into two levels in accordance with the DMA channel signal, the request rearranging section SC1 sets a number of successive transfers for each channel, and each DMA channel signal with the respective priority level is selected and transferred in a successive fashion. Furthermore, number of sets of successive transfers at one priority level is set and transfer priority is switched with each certain number of sets of successive transfers between different levels of priority. For example, once a certain number of sets of successive transfers which is set in advance has been carried out for each channel, the priority of the DMA channel which is to be transferred is switched.

As a result, as illustrated through image data transfers and the like from a digital still camera, in case of a DMA channel signal with fluctuations in the data transfer amount due to a mixture of periods with many memory access requests and periods with a few memory access requests, this makes it possible to prevent system failures caused by disruptions in data transfers associated with the DMA channel signal due to the relationship with data transfers associated with the other DMA channel signal.

For example, the DMA channel signal associated with the image data is set to have level 0 priority, while another DMA channel signal has level 1 priority which is lower than level 0 priority. In this case, data transfers relative to another DMA channel signal having level 1 priority may be carried out at a certain rate while image data transfers with level 0 priority are given priority. This makes it possible to carry out other data transfers while avoiding disruptions in image data transfers.

Figure 13:
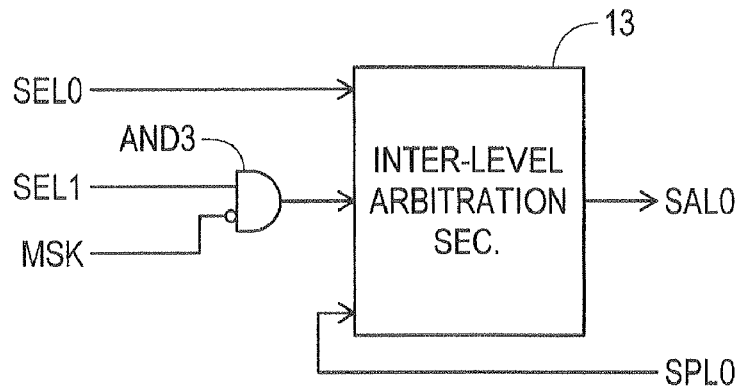
FIG. 13 is a (partial) block diagram of a first modification for controlling issuance of level 1 request.
Figure 14:
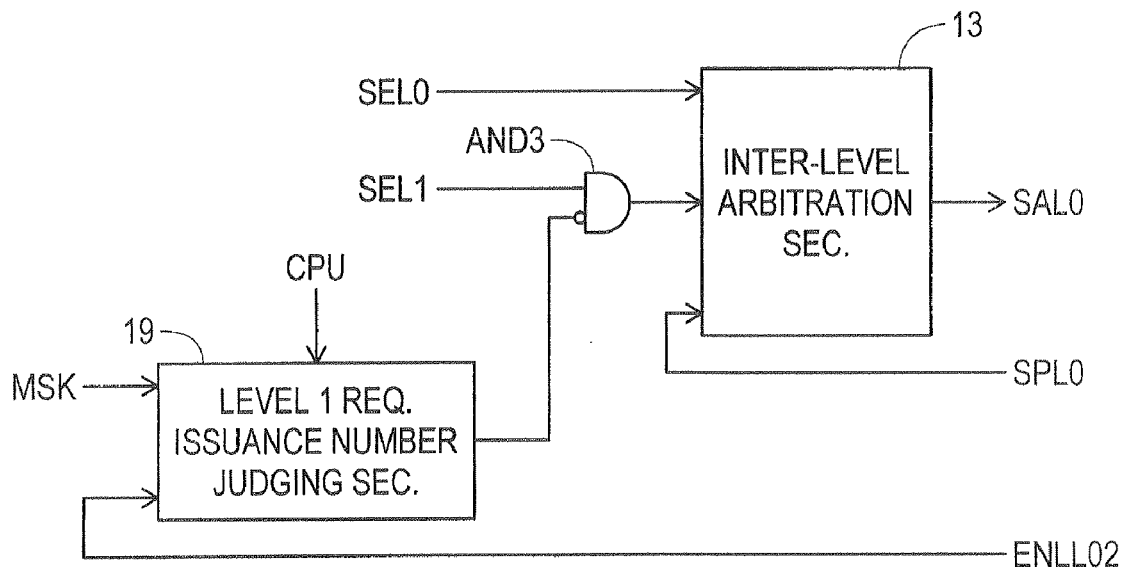
FIG. 14 is a (partial) block diagram of a second modification for controlling issuance of level 1 request.

FIG. 13 through FIG. 15 are modifications of the third embodiment. These modifications control issuance of requests having level 1 priority. According to the third embodiment, in case there are transfer fluctuations in data transfers associated with the DMA channel signals having priority level 0, data transfers associated with other DMA channel signals having level 1 priority are received while transfers are sparse. In this case, if data transfers relative to the DMA channel signals having level 0 priority become dense again, this prevents data transfers relative to the other DMA channel signals with level 1 priority from becoming an obstacle for the level 0 data transfers.

FIG. 13 is a block diagram of a first modification. In the memory access control unit 1C illustrated in FIG. 6, an AND logical circuit AND3 is provided between the validity signal SEL1 to be outputted from the request holding/rearranging section 11B and the inter-level arbitration section 13.

A mask signal MSK for forcibly suppressing transfers of validity signal SEL1 and DMA channel signals having level 1 priority is inputted to the AND logical circuit AND3.

Mask signal MSK is outputted prior to the moment data transfers relative to the DMA channel signals having priority level 0 are resumed. For instance, in the case data relative to the DMA channel signals with level 0 priority is image data, the mask signal MSK is outputted in accordance with a horizontal synchronization signal at the time of imaging. The validity signal SEL1 is masked in the AND logical circuit AND3 when the mask signal MSK is outputted.

As a result, data transfers relevant to the other DMA channel signals having level 1 priority are suppressed, which enables the DMA channel signals for which requests are inputted thereafter and which have level 0 priority to acquire the bus usage right. This prevents disruptions in the data transfers relevant to the DMA channel signals with level 0 priority. Here, the time frame for outputting the mask signal MSK may be extended until the request for the DMA channel signals having level 0 priority is inputted. Thereafter, the request for the DMA channel signals having level 0 priority is given priority.

FIG. 14 is a block diagram illustrating a second modification. In comparison to the first modification (FIG. 13), the second modification has a level 1 request issuance number judging section 19 which outputs a signal to the AND logical circuit AND3 in place of the mask signal MSK.

A mask signal MSK and a second enable signal ENLL02 are inputted to the level 1 request issuance number judging section 19. The level 1 request issuance number judging section 19 is adapted to detect whether or not the output of the DMA channel signal with level 1 priority as established in the channel decision section 15 has reached the number of sets of successive transfers as set in advance in the CPU, etc. If it is determined the number of sets which is set in advance has been reached, the mask signal MSK is outputted to the AND logical circuit AND3 which thus suppresses data transfers relative to the other DMA channel signals with level 1 priority.

As a result, this suppresses data transfers after the number of sets, which is set in advance, of other DMA channel signals having level 1 priority have been outputted, making it possible for the DMA channel signal having level 0 priority and for which a request was inputted thereafter to acquire the bus usage right. Once data transfers relative to the DMA channel signals having level 0 priority are resumed, transfers of the DMA channel signals having level 1 priority are allowed up until a request for data transfers is inputted, while transfers of signals with level 1 priority are suppressed when data transfers relative to DMA channel signals with level 0 priority are initiated.

FIG. 15 is a pattern diagram illustrating data transfers in the first and second modifications. In the first modification, the level 1 DMA channel signal at the time period the mask signal MSK is outputted is suppressed. In FIG. 15, D1 and D2 are suppressed. In the second modification, at the time period the mask signal MSK is outputted, the level 1 DMA channel signal as illustrated at D2 in FIG. 15 is suppressed.

Accordingly, it is possible to carry out in the first and second modifications, data transfers relative to DMA channel signals with level 0 priority without any disruptions while securing data transfers relative to DMA channel signals with level 1 priority. As a result, this suppresses disruptions in data transfers relative to DMA channel signals having level 0 and with fluctuations in data amount, which makes it possible to prevent system failures.

FIG. 16 is a block diagram according to a fourth embodiment. The memory access control unit 1D includes arbitration sections A10 and A11, a selector SEL, a request holding section K10, a level 0 pointer control section C1, a selector control section C2, a request rearranging section SC1, a second transfer parameter selecting section TS2 and a common bus I/F section I1.

Here, circuit elements which are the similar in the first through third embodiments are denoted by the similar symbols, and further description thereof is hereby omitted. Similarly with the third embodiment, transfer parameter signals TP1 through TPn are similar to those in the first embodiment, and therefore are fully omitted in FIG. 16. Further description thereof is also omitted. Similarly with the third embodiment, DMA channel signals DMA1 through DMA5 are described as examples. DMA channels signals DMA1 and DMA2 are DMA channel signals with level 0 priority, while DMA channel signals DMA3 through DMA5 are DMA channel signals with level 1 priority.

Arbitration sections A10 and A11 are provided in accordance with the priority of the DMA channel signal. Respectively, arbitration section A10 arbitrates DMA channel signals DMA1 and DMA2 having level 0 priority, while arbitration section A11 arbitrates DMA channel signals DMA3 through DMA5 having level 1 priority. The basic functions are similar to those for the arbitration section A1 (FIG. 1) according to the first embodiment.

Selector SEL selects one of the DMA channel signals which have been subjected to arbitration in the arbitration section A10 or A11. The selector control section C2 to be described hereinafter controls the selection process. For example, in accordance with control performed by the selector control section C2, input of DMA channel signals which have level 1 priority and are outputted from the arbitration section A11 is suppressed, so that priority is given to input of DMA channel signals which have level 0 priority and are outputted from the arbitration section A10.

The request holding section K10 also includes a level 0 request holding pointer K14, a level 0 counter K17 and a level 1 counter K19, in addition to the circuit elements of the request holding section K1 according to the first embodiment.

The level 0 request holding pointer K14 basically indicates, in the registers of the DMA channel request holding section K11, the lowest address amongst the addresses of the registers holding the level 0 DMA channel signals. The request holding pointer K15 indicates the lowest address amongst the addresses of the registers holding both level 0 and level 1 DMA channel signals. The DMA channel signals with level 0 priority are stored in the DMA channel request holding section K11 based on the level 0 request holding pointer K14, while the DMA channel signals with level 1 priority are stored in the DMA channel request holding section K11 based on the request holding pointer 15. As a result, the DMA channel signals with level 0 priority are stored at the higher-order addresses in the registers of the DMA channel request holding section K11.

Level 0 counter K17 and level 1 counter K19 each count the number of times the DMA channel signals with level 0 priority and the DMA channel signals with level 1 priority are inputted to the DMA channel request holding section K11.

Similarly with the memory access control unit 1 according to the first embodiment, the memory access control unit 1D according to the fourth embodiment basically carries out selection so that the request rearranging section SC1 rearranges the output order of the DMA channel signals stored in the DMA channel holding section K11. In this case, the following two features are added.

According to the first feature, the memory access control unit 1D controls the address where the DMA channel signals with level 0 priority are stored in the registers of the DMA channel request holding section K11. The DMA channel signals with level 0 priority are successively stored by the level 0 request holding pointer K14 in registers with higher-order addresses in the DMA channel request holding section K11. This is because level 0 priority DMA channel signals are selected and outputted on a preferential basis. However, depending on the number of stored DMA channel signals, it may be possible that a state wherein DMA channel signals with level 1 priority which are stored at the lower-order addresses may no longer be outputted may become continuous. In this case, controlling the storage addresses of the registers in the DMA channel request holding section K11 makes it possible to output DMA channel signals with level 1 priority at a certain rate.

This first feature is achieved by the level 0 pointer control section C1. The level 0 pointer control section C1 compares the count value in the level 0 counter K17 with the value set in advance by the CPU, etc. each time DMA channel signals with level 0 priority are inputted. In case the count value reaches the set value, the value of the level 0 request holding pointer K14 is compared to the value of the request holding pointer K15, and in case the value does not coincide, the value of the level 0 request holding pointer K14 is increased by +2, which includes the regular +1 and another +1. At the same time, the level 0 counter K17 is reset to "0". As a result, the DMA channel signals with level 0 priority which are to be inputted next may be stored at the lower-order addresses of the DMA channel signals with level 1 priority which are stored in the registers in the DMA channel request holding section K11.

As illustrated in FIG. 16, the value of the level 0 request holding pointer K14 is indicated by k, while the value of the request holding pointer K15 is indicated by m. In this case, the set value with respect to the count value of the level 0 counter K17 is indicated by k. In this case, the value of the level 0 request holding pointer K14 is increased by +2, and therefore becomes k+2, in accordance with the input of the next DMA channel signal with level 0 priority. As a result, the next DMA channel signal with level 0 priority may be stored at address k+2, while DMA channel signal DMA3 with level 1 priority which is stored at address k+1 is stored at a higher-order address. This way, transfer of the DMA channel signal DMA3 may be reliably carried out.

According to the above first feature, with respect to the storage sequence of the DMA channel signals in the DMA channel request holding section K11, provision of the level 0 request holding pointer K14 and the level 0 counter K17 in addition to the request holding pointer K15 makes it possible to store the DMA channel signals with level 0 priority at the higher-order addresses on a preferential basis and also store the DMA channel signals with level 1 priority at a rate in accordance with the set value to be compared with the count value of the level 0 counter K17. This makes it possible to mix the DMA channel signals with level 1 priority and DMA channel signals with level 0 priority and execute transfers while giving priority to DMA channel signals with level 0 priority.

The second feature prevents the registers of the DMA channel request holding section K11 with a limited number of storage areas from filled up with DMA channel signals having level 1 priority, which in turn prevents a situation in which DMA channel signals with level 0 priority may no longer be stored. In case of fluctuations in transfer requests for the DMA channel signals with level 0 priority, inputs of the DMA channel signals with level 1 priority are accepted in the sparse state of transfer requests for the DMA channel signals with level 0 priority. However, by limiting the number of accepted requests for the DMA channel signals with level 1 priority, it is possible to accommodate dense transfer requests of the next DMA channel signals with level 0 priority.

This second feature is achieved by the selector control section C2. Each time DMA channel signals with level 1 priority are inputted, the selector control section C2 compares the count value of the level 1 counter K19 with the value set in advance by the CPU, etc. Depending on whether the count value reaches the set value, the selector control section C2 controls the selector SEL and prevents selection of the DMA channel signals at the arbitration section A11 (in the case of control (a)). Alternatively, the selector control section C2 prevents the DMA channel signals DMA3 through DMA5 with level 1 priority from being inputted to the arbitration section A11 (in the case of control (b)). Therefore, the maximum count value of the level 1 counter K19 is set to the value which is set in advance by the CPU, etc.

As a result, input of DMA channel signals with level 1 priority is suppressed. Accordingly, even in case of fluctuations in transfer requests for DMA channel signals with level 0 priority, the number of inputs of DMA channel signals with level 1 priority may be limited to a number which is set in advance and register regions may be secured in the DMA channel request holding section K11. The DMA channel signals may be stored in the registers in the DMA channel request holding section K11 which prevents any system failures even in the case dense requests of DMA channel signals with level 0 priority have been resumed.

An example of the operation according to the fourth embodiment is described in FIG. 17. State (1) illustrates the initial state. DMA channel signals DMA1, DMA2 and DMA3 are stored in the registers of DMA channel request holding section K11 starting from higher-order addresses. Also, the value of the level 0 request holding pointer K14 is "1", the value of the request holding pointer K15 is "2", the value of the level 0 counter K17 is "2" and the value of the level 1 counter K19 is "1". Here, the level 0 counter K17 is set by the CPU or the like to count from the initial value "0" to the maximum value "3", and then execute a count operation of resetting to "0". The level 1 counter K19 has the maximum value set to "2" and counts from the initial value "0" to the maximum value "2".

Once the DMA channel signal DMA1 is inputted at status (1), it is stored at address 2 in the DMA channel request holding section K11 since the value of the level 0 request holding pointer K14 is "1". The value of the level 0 request holding pointer K14 is increased to "2", the value of the request holding pointer K15 is increased to "3" and the value of the level 0 counter K17 is increased to "3" (status (2)).

Once the DMA channel signal DMA4 is inputted at status (2), it is stored at address 4 in the DMA channel request holding section K11 since the value of the request holding pointer K15 is "3". Then the value of the request holding pointer K15 is increased to "4", and the value of the level 1 counter K19 is increased to "2". As the value of the level 1 counter K19 reaches the set value, the DMA channel signal with level 1 priority is not inputted in the subsequent operation (status (3)).

Once the DMA channel signal DMA2 is inputted at status (3), it is stored at address 3 in the DMA channel request holding section K11 since the value of the level 0 request holding pointer K14 is "2". As the value of the level 0 counter K17 is "3" and reaches the set value, the value of the level 0 request holding pointer K14 is increased by +2, and is therefore increased to "4", in place of "3". The value of the request holding pointer K15 is reset to "5", while the value of the level 0 counter K17 is reset to "0". (status (4)).

Once the DMA channel signal DMA1 is inputted at status (4), it is stored at address 5 in the DMA channel request holding section K11 since the value of the level 0 request holding section K14 is "4". The value of the level 0 request holding pointer K14 is increased to "5", the value of the request holding pointer K15 is increased to "6" and the value of the level 0 counter K17 is increased to "1" (status (5)).

Once the DMA channel signal DMA2 is inputted at status (5), it is stored at address 6 in the DMA channel request holding section K11. The DMA channel signals DMA1 stored at the higher-order address are first rearranged, then transferred. Furthermore, the DMA channel signal DMA2 is also transferred. The value of the level 0 request holding pointer K14 is turned to "3" since there is one input and three transfers, the value of the request holding pointer K15 is also turned to "4", and the value of the level 0 counter K17 is increased to "2". (status (6))

At status (6), the DMA channel signal DMA2 stored at the higher-order address is transferred. As there is one transfer, the value of the level 0 request holding pointer K14 is set to "2", while the value of the request holding pointer K15 is set to "3" (status (7)).

At status (7), the DMA channel signal DMA3 stored at the higher-order address is transferred. As there is one transfer, the value of the request holding pointer K15 is decreased to "2", while the value of the level 1 counter K19 is decreased to "1". This enables acceptance of the DMA channel signals with level 1 priority in subsequent operations (status (8)).

Once the DMA channel signal DMA5 is inputted at status (8), it is saved at address 3 in the DMA channel request holding section K11 since the value of the request holding pointer K15 is "2". The value of the request holding pointer K15 is increased to "3", while the value of the level 1 counter K19 is increased to "2" (status (9)).

The arbitration section A1 outputs data transfer requests to the request holding section K1 in accordance with the priority order of each DMA channel as set in advance and the order in which the data transfer requests were received. The order of the signals outputted by the arbitration section A1 represents one example of a basic transfer order.

Further, a DMA channel signal and a transfer parameter signal each represent one example of a data transfer request.

Further, a current pointer SC133 represents one example of a first pointer, and a next pointer 135 represents one example of a second pointer. A register of a DMA channel request holding section K11 and a register of a transfer parameter holding section K13 each represent one example of a register.

Further, level 0 priority represents one example of a first priority level, and level 1 priority represents one example of a second priority level. DMA channel signals having level 0 priority (DMA channel signals DMA1 and DMA2) represent one example of a first channel group and DMA channel signals having level 1 priority (DMA channel signals DMA3 through DMA5) represent one example of a second channel group. A request holding section K1 and a request rearranging section SC1 provided in a request holding/rearranging section 11A represent one example of a first request holding section and one example of a first request rearranging section, respectively, and a request holding section K1 and a request rearranging section SC1 provided in a request holding/rearranging section 11B represent one example of a second request holding section and one example of a second request rearranging section, respectively. An inter-level arbitration section 13, a channel decision section 15, a priority flag generation section 17 and AND logical circuits AND1 and AND2 represent one example of a priority level arbitration section. An AND logical circuit AND3 represents one example of a first mask section, and a level 1 request issuance number judging section 19 and an AND logical circuit AND1 represent one example of a second mask section.

Further, a level 1 request holding pointer K14 represents one example of a first request holding pointer, a level 0 counter K17 represents one example of a first counter, a request holding pointer K15 represents one example of a second request holding pointer, a level 0 counter K19 represents one example of a second counter, a level 0 pointer control section C1 represents one example of a pointer control section and a selector control section C2 represents one example an input mask section.

According to the above-described embodiments, when any of a plurality of DMA channels are dynamically selected and data transfers to the memory are executed, a certain number of data transfer requests are successively received for each DMA channel, which enables high efficiency data transfers.

The present disclosure makes it possible to rearrange data transfer requests which have been received in a discontinuous fashion into a successive fashion for each channel, and further, to ensure that a plurality of DMA channels are successively accessed evenly for data transfers. Accordingly, highly efficient data transfers may be realized.

The present application is not limited to the first through fourth embodiments as described above. In the above-described embodiments, a description was given of the case that priority has two levels, level 0 and level 1, however, the present application is not limited to this example. The above-described embodiments may also be applied to signals having more than three priority levels by performing arbitration for each priority level in advance.

With respect to the fourth embodiment, a description is given wherein a DMA channel signal with level 0 priority is stored at a lower-order address which is 1 address lower than the register wherein DMA channel signals with level 1 priority are stored in accordance with specific conditions. However, the present embodiment is not limited to this example alone. The above signals may also be stored at a lower-order address which is lower by 2 or more addresses. As a result, the number of DMA channel signals with level 1 priority which are to be transferred prior to signals with level 0 priority may be adjusted accordingly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data transfer control device that selects one of a plurality of DMA channels and transfers data to or from memory, the data transfer control device comprising:
   a request holding section configured to hold a certain number of data transfer requests of the plurality of DMA channels; and a request rearranging section configured to select and rearrange the data transfer requests that are held in a basic transfer order so that the data transfer requests of each of the plurality of DMA channels are successively outputted for a number of successive transfers set in advance;

wherein a part of the plurality of DMA channels belongs to a first channel group associated with a first priority level, and another part of the plurality of DMA channels belongs to a second channel group associated with a second priority level which is lower in priority than the first priority level, wherein the request holding section comprises:
a first request holding section configured to hold a data transfer request of a DMA channel belonging to the first channel group; and
a second request holding section configured to hold a data transfer request of a DMA channel belonging to the second channel group, wherein the request rearranging section comprises:
a first request rearranging section configured to select and rearrange the data transfer requests that are held in the basic transfer order by the first request holding section so that the data transfer requests of each of the plurality of DMA channels are successively outputted for a first number of successive transfers set in advance;
a second request rearranging section configured to select and rearrange the data transfer requests that are held in the basic transfer order by the second request holding section so that the data transfer requests of each of the plurality of DMA channels are successively outputted for a second number of successive transfers set in advance; and
a priority level arbitration section wherein, each time it turns valid to successively select a number of first sets, each of the first sets comprising the first number of successive transfers selected by the first request rearranging section, it turns valid to successively select a number of second sets, each of the second sets comprising the second number of successive transfers selected by the second request rearranging section.

2. The data transfer control device according to claim 1 further comprising a first mask section configured to mask the data transfer request held at the second request holding section from being selected by the second request rearranging section for a certain period ranging from a timing when a data transfer request of a DMA channel belonging to the first channel group is not held at the first request holding section to a timing when a data transfer request of a DMA channel belonging to the first channel group is newly held.

3. The data transfer control device according to claim 1 further comprising a second mask section configured to mask the data transfer request held at the second request holding section from being selected by the second request rearranging section in response to enabling of successive selection of a number of third sets, which is larger than the number of second sets according to the second request rearranging section.

4. The data transfer control device that selects one of a plurality of DMA channels and transfers data to or from memory, the data transfer control device comprising:

a request holding section configured to hold a certain number of data transfer requests of the plurality of DMA channels; and
a request rearranging section configured to select and rearrange the data transfer requests that are held in a basic transfer order so that the data transfer requests of each of the plurality of DMA channels are successively outputted for a number of successive transfers set in advance, wherein the request holding section comprises:
a plurality of registers configured to store the data transfer requests respectively in accordance with the basic transfer order, wherein the request rearranging section comprises:
a first pointer configured to indicate one of the plurality of registers that stores a data transfer request to be selected at current transfer timing; and
a second pointer configured to indicate another one of the plurality of registers that stores a data transfer request to be selected at next transfer timing, wherein a part of the plurality of DMA channels belongs to a first channel group associated with a first priority level, and another part of the plurality of DMA channels belongs to a second channel group associated with a second priority level which is lower in priority than the first priority level, and wherein the request holding section further comprises:
a first request holding pointer configured to increment "1" in each input of the data transfer request belonging to the first channel group or decrement "1" in each output thereof, and indicate a storing location in the plurality of registers with respect to the data transfer request to be input;
a first counter configured to count how many times a data transfer request belonging to the first channel group is input, and the first counter that is initialized when a certain number of inputs is counted;
a second request holding pointer configured to increment "1" in each input of the data transfer request belonging to at least any one of the first channel group and second channel group or decrement "1" in each output thereof, and indicate a storing location in the plurality of registers with respect to the data transfer request to be input, the storing location which comes lowest in the plurality of registers; and
a pointer control section configured to increment a given number which is larger than "1" to the first request pointer in response to initialization of the first counter when a value of the first request holding pointer is smaller than a value of the second holding pointer.

5. The data transfer control device according to claim 4 further comprising:
a second counter configured to count up in each input of the data transfer request belonging to the second channel group and count down in each output thereof; and
an input mask section configured to mask an input of the data transfer request belonging to the second channel group when a count value of the second counter is a given count value.

* * * * *